(12) United States Patent
Wilke et al.

(10) Patent No.: US 11,572,909 B2
(45) Date of Patent: Feb. 7, 2023

(54) TOLERANCE COMPENSATION FASTENING APPARATUSES WITH EXTENDED TOLERANCE COMPENSATION AND SIMPLER AND QUICKER FASTENING

(71) Applicant: ILLINOIS TOOL WORKS INC., Glenview, IL (US)

(72) Inventors: Zsolt Wilke, Bad Mergentheim (DE); Roland Och, Rottendorf (DE); Matthias Seubert, Giebelstadt (DE); Johannes Karlein, Kleinrinderfeld (DE); Andreas Rudolf, Wurzburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 357 days.

(21) Appl. No.: 16/642,106

(22) PCT Filed: Aug. 23, 2018

(86) PCT No.: PCT/US2018/047624
§ 371 (c)(1),
(2) Date: Feb. 26, 2020

(87) PCT Pub. No.: WO2019/046079
PCT Pub. Date: Mar. 7, 2019

(65) Prior Publication Data
US 2020/0208661 A1    Jul. 2, 2020

(30) Foreign Application Priority Data
Aug. 29, 2017 (DE) .......................... 102017119857.1
Apr. 27, 2018 (EP) ..................................... 18169992

(51) Int. Cl.
*F16B 5/02* (2006.01)
*F16B 37/04* (2006.01)
*F16B 41/00* (2006.01)

(52) U.S. Cl.
CPC .......... *F16B 5/0233* (2013.01); *F16B 5/0225* (2013.01); *F16B 5/02* (2013.01); (Continued)

(58) Field of Classification Search
CPC ........ F16B 5/02; F16B 5/0225; F16B 5/0233; F16B 5/0266; F16B 5/0283; F16B 37/04; (Continued)

(56) References Cited

U.S. PATENT DOCUMENTS

| 6,357,953 | B1 * | 3/2002 | Ballantyne | F16B 5/0233 403/372 |
| 6,585,447 | B2 * | 7/2003 | Schwarzbich | F16B 5/0233 411/546 |

(Continued)

FOREIGN PATENT DOCUMENTS

| CN | 1505740 A | 6/2004 |
| CN | 201293032 Y | 8/2009 |

(Continued)

OTHER PUBLICATIONS

PCT, International Search Report and Written Opinion, International Application No. PCT/US2018/047624; dated Nov. 19, 2018, 19 pages.

*Primary Examiner* — Roberta S Delisle
(74) *Attorney, Agent, or Firm* — Thompson Hine LLP

(57) ABSTRACT

A tolerance compensation fastening apparatus (1) for fastening a first vehicle component (200) to a second vehicle component (300) by way of a bolt (100), the fastening apparatus being set up to compensate for a tolerance within a tolerance compensation range. A fastening system including such a fastening apparatus, as well as to a method for fastening a first vehicle component to a second vehicle component by way of a bolt.

28 Claims, 21 Drawing Sheets

(52) U.S. Cl.
CPC ........... *F16B 5/0266* (2013.01); *F16B 5/0283* (2013.01); *F16B 37/044* (2013.01); *F16B 41/002* (2013.01)

(58) Field of Classification Search
CPC ...... F16B 37/044; F16B 41/002; F16B 43/00; Y10T 403/75
USPC ................................ 411/383, 384, 432, 546
See application file for complete search history.

(56) References Cited

U.S. PATENT DOCUMENTS

| | | | |
|---|---|---|---|
| 8,066,465 B2* | 11/2011 | Figge | F16B 19/1072 411/546 |
| 8,864,432 B2* | 10/2014 | Figge | F16B 37/042 411/383 |
| 8,944,736 B2* | 2/2015 | Figge | B60R 9/058 224/322 |
| 2002/0076269 A1* | 6/2002 | Schwarzbich | F16B 5/0233 403/167 |
| 2002/0154966 A1 | 10/2002 | Stone | |
| 2005/0047893 A1 | 3/2005 | Schwarzbich | |
| 2007/0009342 A1* | 1/2007 | Figge | F16B 5/025 411/546 |
| 2007/0051912 A1 | 3/2007 | Arosio | |
| 2007/0092355 A1* | 4/2007 | Burger | F16B 5/0233 411/551 |
| 2009/0190993 A1* | 7/2009 | De Gelis | F16B 5/0233 403/47 |
| 2012/0090146 A1 | 4/2012 | Figge | |
| 2013/0315658 A1* | 11/2013 | Schwarzbich | F16B 5/0266 403/229 |
| 2015/0330435 A1* | 11/2015 | Schwarzbich | F16B 35/04 411/16 |

FOREIGN PATENT DOCUMENTS

| | | |
|---|---|---|
| CN | 102138011 A | 7/2011 |
| CN | 202209346 U | 5/2012 |
| DE | 3304569 C1 | 7/1984 |
| DE | 3616536 C1 | 7/1987 |
| DE | 20313241 U1 | 12/2004 |
| DE | 102013103398 A1 | 11/2013 |
| EP | 0679553 A1 | 11/1995 |
| EP | 1744063 A2 | 1/2007 |
| JP | 2007071391 A | 3/2007 |

* cited by examiner

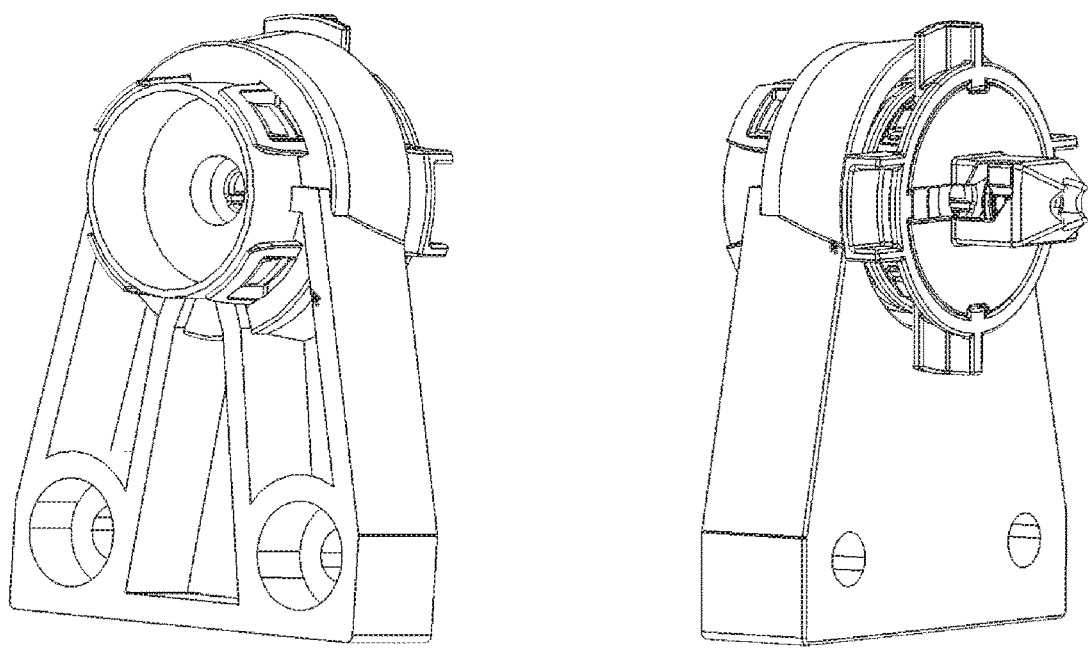
Fig. 4c
Fig. 4d
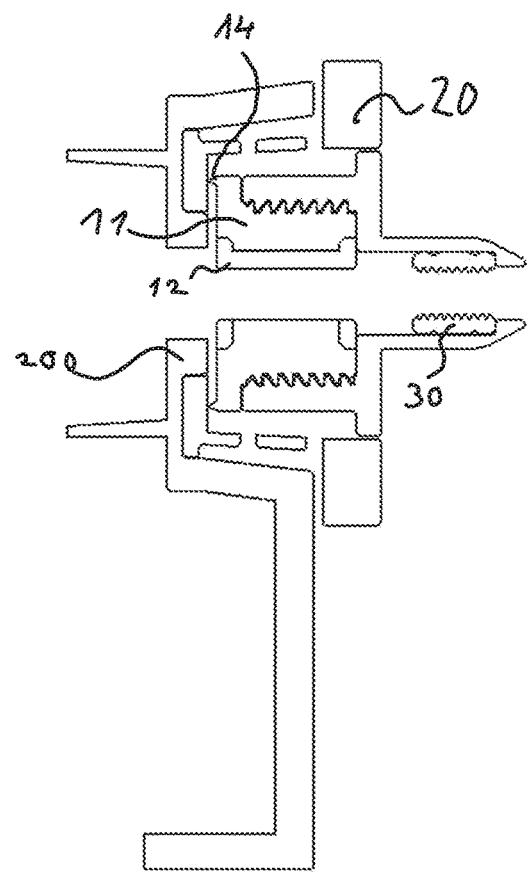
Fig. 4e

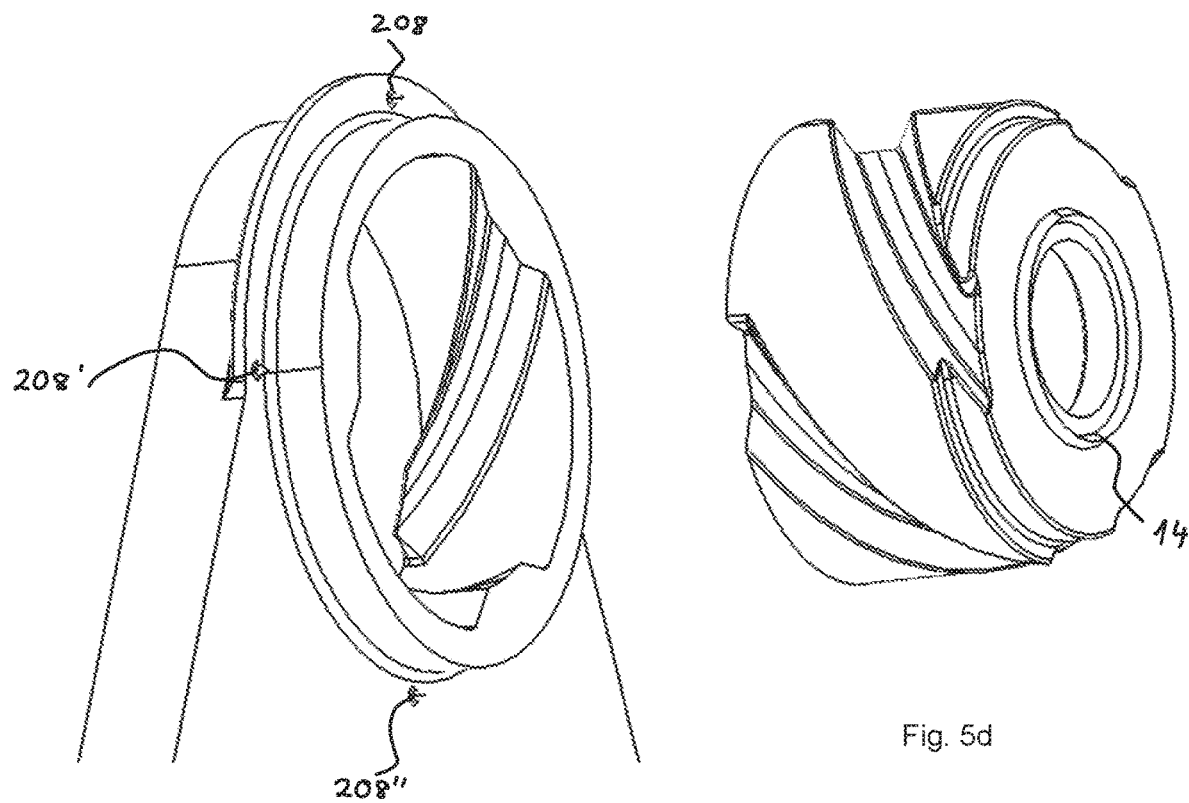
Fig. 5c
Fig. 5d
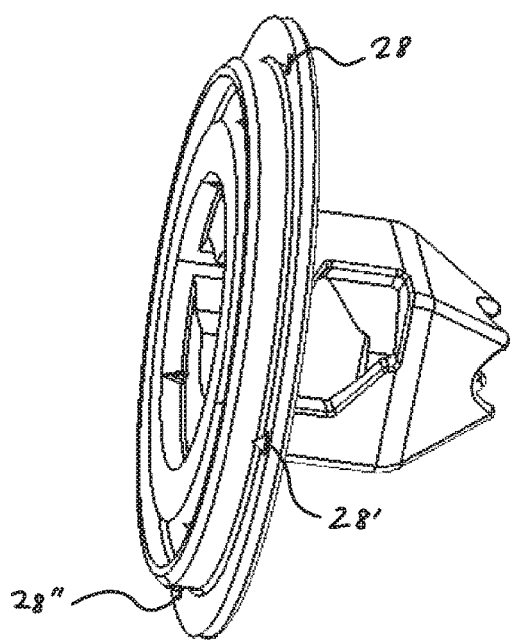
Fig. 5e

TOLERANCE COMPENSATION FASTENING APPARATUSES WITH EXTENDED TOLERANCE COMPENSATION AND SIMPLER AND QUICKER FASTENING

TECHNICAL FIELD

The invention relates to a tolerance compensation fastening apparatus for fastening a first vehicle component to a second vehicle component by means of a bolt, to a fastening system comprising a fastening apparatus according to the invention and to a method for fastening a first vehicle component to a second vehicle component by means of a bolt.

BACKGROUND AND SUMMARY

It is the object of the present invention to improve the disadvantages of tolerance compensation fastening apparatuses.

The object is achieved by the independent claims and by individual aspects or overall combinations of the technical matters described here or shown in the figures. Advantageous further developments are defined in the sub claims.

The object is achieved in particular by a tolerance compensation fastening apparatus for fastening a first vehicle component to a second vehicle component by means of a bolt, the fastening apparatus having a longitudinal opening for receiving the bolt, the fastening apparatus having a first compensation unit which is set up to compensate for a tolerance along the longitudinal direction (y) within a first tolerance compensation range, and which has, for this purpose, a first component, a movement of the bolt preferably being transmissible to the first component of the first compensation unit, preferably by means of one or multiple friction elements or friction structures of the first or second components, as a result of friction between the one or the multiple friction elements or friction structures and the bolt, and a) the first component being mounted on a second component of the fastening apparatus, or b) the fastening apparatus being preassembled via the first component on the first vehicle component, by the first component being mounted on the first vehicle component, preferably with the result that a first axial end of the fastening apparatus faces or is assigned to the first vehicle component, the first component being movable, in the respective mounted state, preferably as long as no end fixing by means of the bolt is yet effected, in the longitudinal direction (y) on account of the mounting within the first tolerance compensation range, e.g. as a result of displacement or, when there is a threaded mounting, (preferably also) rotation, and therefore having a degree of longitudinal freedom, the fastening apparatus having a second compensation unit which is set up to compensate for a tolerance along one or more transverse directions (x, z), and which has, for this purpose, one or more connecting and/or guide elements, by means of which, in case a), the second component or the first component can be preassembled on the first vehicle component with the result that it can be moved in the direction of the one or more transverse directions (x, z) within a second tolerance compensation range, with the result that a first axial end of the fastening apparatus faces the first vehicle component, or, in case b), a second component of the fastening apparatus is mounted on the first component or another component of the fastening apparatus with the result that it can be moved in the direction of the one or more transverse directions (x, z) within a second tolerance compensation range, and the second component therefore has one or more degrees of transverse freedom.

As a result, compensation of tolerances of the vehicle components is possible not only in the longitudinal direction but also in one or a plurality of transverse directions. The maximum tolerance compensation range in the transverse direction is preferably the diameter of the shank section coming to lie in the opening in the fastened state of the fastening apparatus.

In a further exemplary embodiment of the present invention, the diameter of the fastening apparatus tapers towards a second axial end of the fastening apparatus, which second axial end lies opposite the first axial end, and starting from a shank section which comes to lie in an opening of the second vehicle component in the fastened state of the fastening apparatus, the tapering of the diameter from the shank section to the first axial end being greater than or equal to the second tolerance compensation range.

In a further exemplary embodiment of the present invention, the one or the plurality of connecting and/or guide elements are of sprung configuration at least in regions, and the second component is arranged in a rest position substantially in a centered manner with regard to the longitudinal axis. A preferably centered rest position of the apparatus is achieved as a result. By means of resiliently bending the connecting and/or guide elements they are left, insofar as tolerance in the transverse direction is required, for compensation of the tolerance in the transverse direction.

In a further exemplary embodiment of the present invention, the one or the plurality of connecting and/or guide elements is configured as a flexible, hose-like hollow body with a round or angular cross section. As a result, they can be produced in a space-saving and simple manner.

In a further exemplary embodiment of the present invention, it is possible for the one or the plurality of connecting and/or guide elements to be compressed in the longitudinal direction. As a result, they can also be preassembled fixedly on the apparatus in the pre-mounting position also in the longitudinal direction whereby the assembly in the remounting position is more sturdy and does not wobble around, in particular when, which is preferred, a pretension is applied in the longitudinal direction to the one or the plurality of the connecting and/or guide elements by the bolt when the apparatus is mounted with the result that it/they is/are pressed forward.

In a further exemplary embodiment of the present invention, the one or the plurality of connecting and/or guide elements is formed at least partially, preferably completely, from foam. Cost-efficient production is possible as a result.

In a further exemplary embodiment of the present invention, the one or the plurality of connecting and/or guide elements is formed at least partially, preferably completely, by way of a serpentine-like circumferential face which is formed preferably from plastics materials. Alternative cost-efficient production is possible as a result.

In a further exemplary embodiment of the present invention, the one or the plurality of connecting and/or guide elements is configured at least partially as a spiral spring, preferably with two or more spring flights. These can be produced alternatively in a space-saving and simple manner as a result In a further exemplary embodiment of the present invention, the one or the plurality of connecting and/or guide elements is configured at least partially as a latching retainer. As a result, quick pre-assembly of the fastening apparatus is provided which is also already held together at least partially without the bolt.

In a further exemplary embodiment of the present invention, the first vehicle component and/or the second component have one or a plurality of counter-retainers for retaining the one or plurality of connecting and/or guide elements in a positive locking manner, preferably at least in relation to the one or a plurality of transverse directions.

In a further exemplary embodiment of the present invention, the fastening apparatus is set up to fix the degree of longitudinal freedom of the first component and/or the one or the plurality of degrees of transverse freedom of the second component in a frictionally locking and/or positively locking manner by means of a pressure force which acts by way of the bolt on the first and/or second component. As a result, the adjusted compensation is fixed particularly well as a result of tightening the bolt.

In a further exemplary embodiment of the present invention, the fastening apparatus has one or more ribs or prongs which are set up to fix the degree of longitudinal freedom and/or the one or the plurality of degrees of transverse freedom in a frictionally locking and/or positively locking manner. Favorable and simply producible fixing is provided as a result.

In a further exemplary embodiment of the present invention, the first component is mounted in a rotationally movable manner by means of a first thread, in case a), on the second component of the fastening apparatus in a second thread of the second component, or, in case b), on the first vehicle component in a second thread of the vehicle component, and the movement of the bolt which can be transmitted to the first component is a rotation of the bolt.

The first and second threads are preferably concentric to one another. They are preferably also concentric to the longitudinal opening. The rotational direction of the first and second thread is preferably counter the rotational direction of the bolt to be used, particularly preferably is identical. First and second threads are preferably a left-hand thread, particularly preferably a right-hand thread. In a particularly preferable manner, the threads are not mutually self-locking, as a result of which it is possible to dispense with friction elements, as the necessary entrainment of the first component and therefore the transmission of the movement of the bolt is able to be brought about, preferably brought about precisely by the bolt head.

In a further exemplary embodiment of the present invention, the first component is mounted with the result that it can be displaced along the degree of longitudinal freedom by means of a thrust joint, in case a), on the second component of the fastening apparatus, or, in case b), on the first vehicle component, and the movement of the bolt which can be transmitted to the first component is a displacement of the bolt. As a result, it is possible to dispense with friction elements as the necessary entrainment of the first component and therefore the transmission of the movement of the bolt can be brought about, preferably is brought about precisely by the bolt head.

In a further exemplary embodiment of the present invention, the fastening apparatus has one or more expanding structures which is/are set up to be expanded by way of the pressure force which acts by way of the bolt on the first and/or second component, and thus to block the degree of longitudinal freedom of the thrust joint.

In a further exemplary embodiment of the present invention, the fastening apparatus has a nut element for fastening the fastening apparatus to an opening of the second vehicle component, the nut element being arranged at a second axial end which lies opposite the first axial end and being set up to be expanded radially by means of the bolt being screwed into the fastening apparatus. As a result, particularly quick mounting is possible from only one side of the second vehicle component.

In a further exemplary embodiment of the present invention, the fastening apparatus has a nut element for fastening the fastening apparatus to the second vehicle component, the nut element being arranged at a second axial end which lies opposite the first axial end and being set up to be rotated by means of the bolt being screwed into the fastening apparatus from an introduction position into a locked position which is defined by way of a stop. As a result, particularly quick mounting is possible from only one side of the second vehicle component.

In a further exemplary embodiment of the present invention, the nut element has an elongate cross section, with the result that it can be introduced into an opening of correspondingly elongate shape of the second vehicle component and is therefore set up to transversely undercut the said opening and therefore to lock it in the blocked position, preferably rotated by 90° with respect to the introduction position. As a result, a greater undercut and therefore sturdier fastening is possible than e.g. in the case of a quadratic cross section and 45-degree difference between introduction and blocked position.

In a further exemplary embodiment of the present invention, the nut element is held in a cage which has a, preferably polygonal, particularly preferably rectangular, preferably quadratic cross section, the nut element having radial projections which, in the introduction position, end radially within the cross section or with an identical radial dimension as the cross section and, in the locked position, project radially beyond the cross section. As a result, the nut part can be preassembled in the apparatus even without a bolt.

In a further exemplary embodiment of the present invention, the cage or another component, preferably the second component, of the fastening device, has one or more preferably helix-like guide curves, preferably as edges of one or more nuts or recesses introduced in the cage, for the axial and/or rotational guidance of the nut element, preferably of one or more of the radial projections.

As a result, the nut element obtains rotational forced guidance by means of the force of the bolt, which, when screwing in the bolt, results in the nut element reliably assuming the blocked position. In addition, when axially two-sided, i.e. helix-like guidance of the radial projections is present (which is the case, for example, with a groove), disassembly is made easier as the bolt can be initially unscrewed somewhat and then, as a result of pressure onto the bolt, the nut element can be reliably moved back again into the introduction position. For this purpose, the cage preferably has a stop which defines the introduction position.

The object is further achieved in particular by a tolerance compensation fastening apparatus for fastening a first vehicle component to a second vehicle component by means of a bolt, the fastening apparatus having a longitudinal opening for receiving the bolt, the fastening apparatus having a first compensation unit which is set up to compensate for a tolerance along the longitudinal direction (y) within a first tolerance compensation range, and which has, for this purpose, a first component, a movement of the bolt being able to be transmitted preferably to the first component of the first compensation unit, preferably by means of one or a plurality of friction elements or friction structures of the first or second component as a result of friction between the one or the plurality of friction elements or friction structures and the bolt, and a) the first component being mounted on a second component of the fastening apparatus or b) the fastening apparatus being preassembled via the first component on the first vehicle component, by the first component being mounted on the first vehicle component, preferably with the result that a first axial end of the fastening apparatus faces or is assigned to the first vehicle component, the first component being movable, in the respective mounted state, preferably as long as no end fixing has been effected yet by means of the bolt, in the longitudinal direction (y) on account of the mounting within the first tolerance compensation range, e.g. as a result of displacement or, when a threaded mounting is present, (also preferably) rotation, and therefore having a degree of longitudinal freedom, the fastening apparatus having a nut element for fastening the fastening apparatus to an opening of the second vehicle component, the nut element being arranged at a second axial end which lies opposite the first axial end and being set up to be expanded radially by means of the bolt being screwed into the fastening apparatus or to be rotated by means of the bolt being screwed into the fastening apparatus from an introduction position into a locked position which is defined by way of a stop. As a result, particularly quick mounting is possible from only one side of the second vehicle component.

Said fastening apparatus preferably also has individual or each of the features of the aforenamed fastening apparatus.

The object is further achieved in particular by a tolerance compensation fastening apparatus for fastening a first vehicle component to a second vehicle component by means of a bolt, the fastening apparatus having a longitudinal opening for receiving the bolt, the fastening apparatus having a first compensation unit which is set up to compensate for a tolerance along the longitudinal direction (y) within a first tolerance compensation range, and which has a first component for this purpose, a movement of the bolt being able to be transmitted preferably to the first component of the first compensation unit, preferably by means of one or a plurality of friction elements or friction structures of the first or second component as a result of friction between the one or the plurality of friction elements or friction structures and the bolt and a) the first component being mounted on a second component of the fastening apparatus, or b) the fastening apparatus being preassembled via the first component on the first vehicle component, by the first component being mounted on the first vehicle component, preferably with the result that a first axial end of the fastening apparatus faces or is assigned to the first vehicle component, the first component being movable, in the respective mounted state, preferably as long as no end fixing has been effected yet by means of the bolt, in the longitudinal direction (y) on account of the mounting within the first tolerance compensation range, for example as a result of displacement or, when a threaded mounting is present, (also preferably) rotation, and therefore having a degree of longitudinal freedom, the first component being mounted by means of a first thread in a rotationally movable manner, in case a), on the second component of the fastening apparatus in a second thread of the second component, or, in case b), on the first vehicle component in a second thread of the vehicle component, and the first and second thread being configured in such a way that they do not bring about a self-locking action and therefore form a thrust joint or a push-rotate joint along the degree of longitudinal freedom, and the movement of the bolt which can be transmitted to the first component being a rotation of the bolt and/or a displacement of the bolt in the longitudinal direction. As a result, simpler, quicker and more precise compensation is possible in the longitudinal direction. It is possible (and is also preferable) to dispense with friction elements as the first component is movable axially to compensate for the tolerance in the longitudinal direction also as a result of the thrusting of the bolt. As a result of tightening the bolt, the rotational position of the first component is fixed in relation to the second vehicle component. As a result, the set tolerance compensation is then also fixed in the longitudinal direction on account of the thread (in contrast to a pure sliding joint as for example in FIGS. 3a, 3b) when the first vehicle component is still expediently connected to the second vehicle component via a point with the result that rotation can no longer take place between the two further vehicle components about the axis defined by the bolt. The connection to the further point is preferably effected by means of a second such tolerance compensation fastening apparatus.

Said fastening apparatus preferably also has individual or each of the features of the aforenamed fastening apparatus.

Two suitable threads are preferably self-locking when the bolt cannot be displaced in an axially rotating manner as a result of axial pressure on the threaded components (for example the bolt). Two suitable threads are preferably not self-locking when the bolt is able to be displaced in an axially rotating manner as a result of axial pressure on the threaded components (for example the bolt).

The object is further achieved in particular by a fastening system comprising a fastening apparatus according to the invention according to the prior description, a first vehicle component, a second vehicle component and a bolt, the second vehicle component having one or more first centering elements, and the first vehicle component having one or more second centering elements which can be brought into contact with the first centering elements, and the correct installation situation being defined preferably with reference to one or a plurality of transverse directions when the first and second centering elements bear against one another.

The first and second centering elements are preferably set up so as to mutually interlock.

In a further exemplary embodiment of the fastening system according to the invention, the fastening system is set up to cut into the fastening apparatus or into the first or the second vehicle component up to a predefined dimension by way of a pressure force which is applied by means of the bolt head of the bolt to the composite structure comprising the vehicle components and the fastening apparatus, or to deform the fastening apparatus or the first or the second vehicle component up to a predefined dimension, with the result that the longitudinal extent of the composite structure comprising the vehicle components and the fastening apparatus is reduced by a predefined dimension, and one or more, preferably all centering elements move away from one another again by a predefined dimension at least in the longitudinal direction.

In a further exemplary embodiment of the fastening system according to the invention, the first vehicle component is a door handle module, and the second vehicle component is a vehicle door with an outer skin and with a cut-out in the outer skin for a door handle of the door handle module, the one or the plurality of first centering elements being arranged at a spacing of less than 1 cm from the edge of the cut-out.

Precise centering of the door handle in the door handle cutout is achieved as a result. The centering elements are preferably flaps which are bent-in directly in the direction of the door interior on the edge of the cutout.

The object is further achieved in particular by a method for fastening a first vehicle component to a second vehicle component by means of a fastening apparatus, preferably a fastening apparatus according to the invention, comprising the following steps:

preassembling of the fastening apparatus on the first vehicle component,
bringing first centering elements of the second vehicle component into contact with second centering elements of the first vehicle component,
fastening of the first vehicle component to the second vehicle component by way of the bolt being screwed into the fastening apparatus, a tolerance being compensated for here along the longitudinal direction (y) within a first tolerance compensation range by means of a first compensation unit of the fastening apparatus, a tolerance being compensated for along one or more transverse directions (x, z) within a second tolerance compensation range by way of the first and second centering elements being brought into contact, and by way of the first vehicle component being fastened to the second vehicle component by way of the bolt being screwed into the fastening apparatus.

In a further method according to the invention, the bolt is tightened at the end of the method and in the process is cut into the fastening apparatus or into the first or the second vehicle component up to a predefined dimension by way of a pressure force which is applied by means of the bolt head of the bolt to the composite structure comprising the vehicle components and the fastening apparatus, or the fastening apparatus or the first or the second vehicle components are deformed up to a predefined dimension, as a result of which the longitudinal extent of the composite structure comprising the vehicle components and the fastening apparatus is reduced by a predefined dimension, and therefore one or more, preferably all centering elements move away from one another again by a predefined dimension at least in the longitudinal direction.

BRIEF DESCRIPTION OF THE DRAWINGS

The invention is now to be illustrated further as an example by way of drawings, in which:

FIGS. 4a-4e show various perspective representations and a sectional representation (4e) of a fourth apparatus according to the invention, FIGS. 5a-5i show various perspective representations and a sectional representation of a fifth apparatus according to the invention, (5h and i, h showing the preassembled position on the first vehicle component 200 and i the final position also fastened on the second vehicle component 300)

DETAILED DESCRIPTION

Figure 1A:
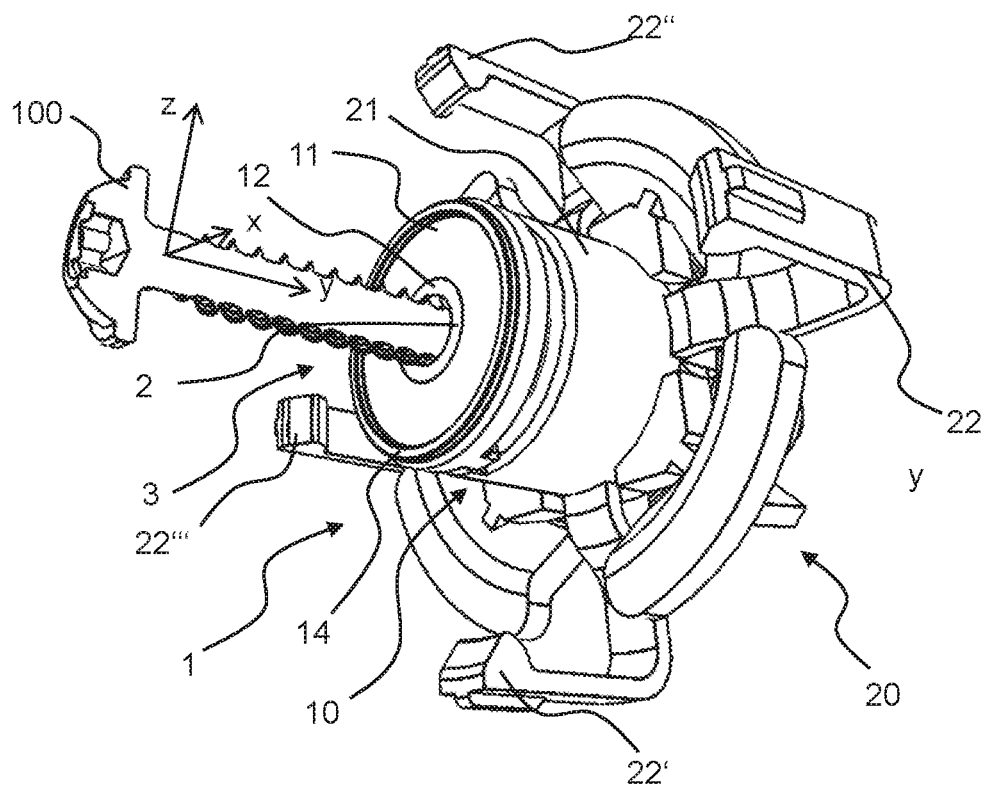
FIGS. 1a-1i show a first apparatus according to the invention, FIGS. 1c-1i showing various steps of the fastening process.
Figure 1B:
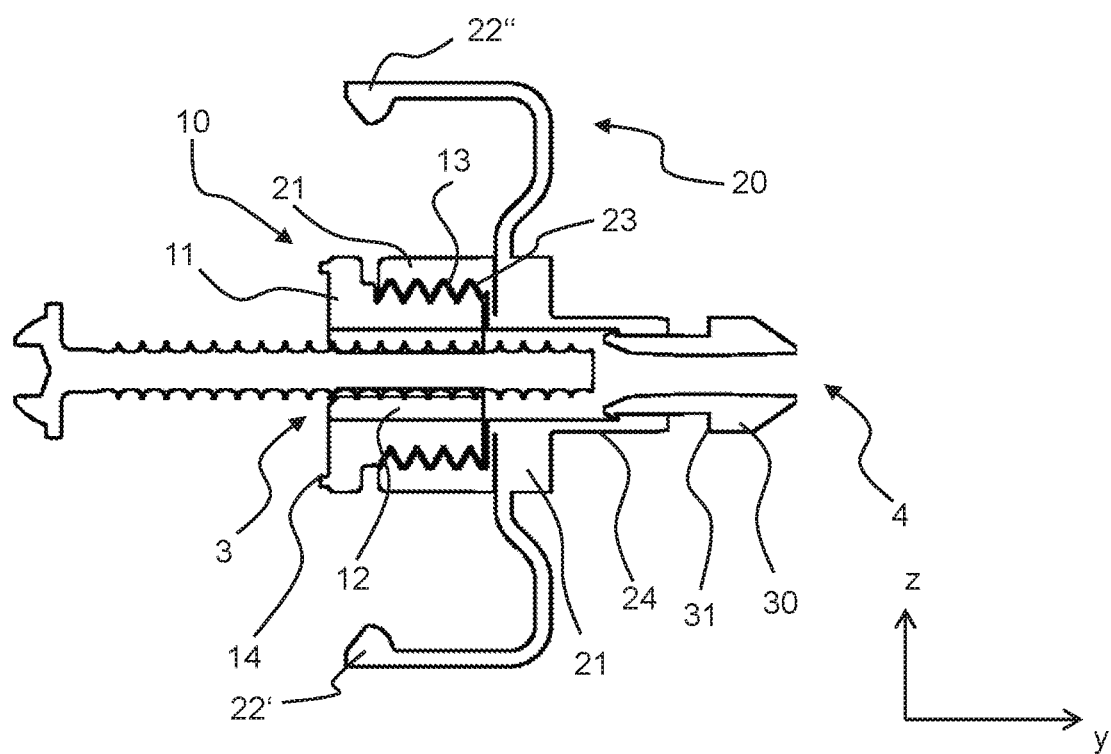
Figure 1C:
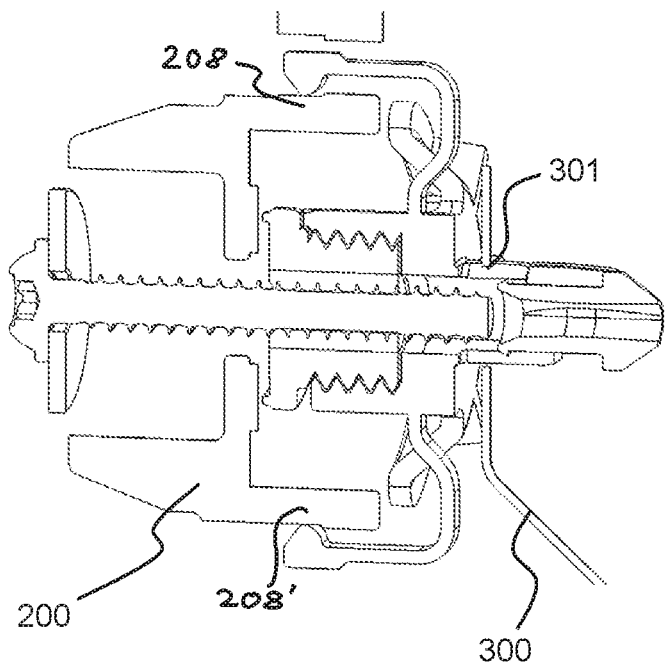
Figure 1D:
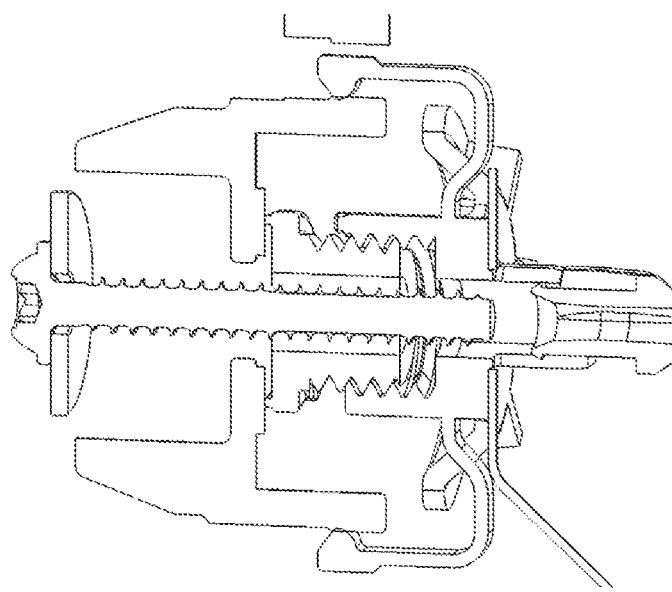
Figure 1E:
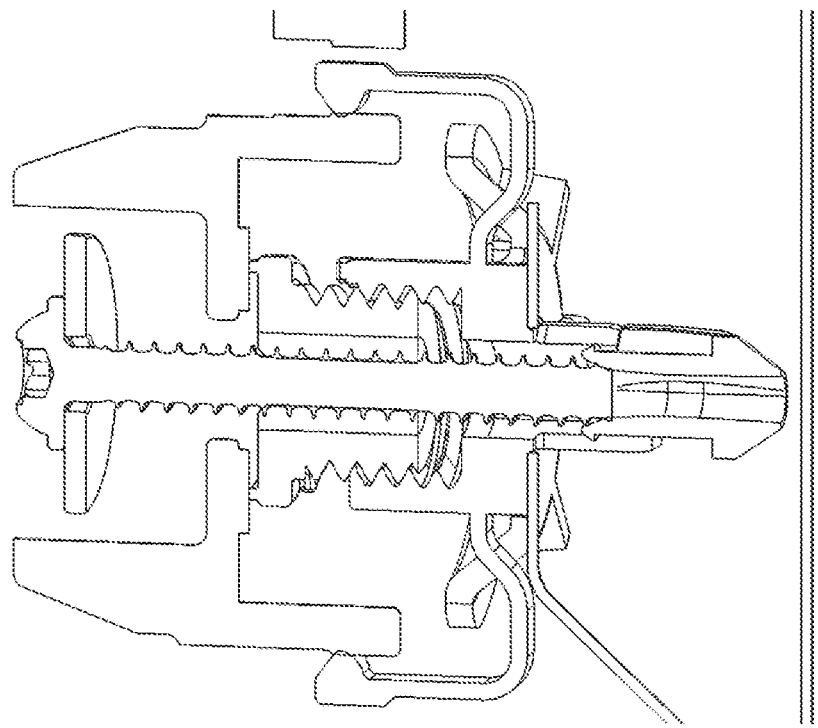
Figure 1F:
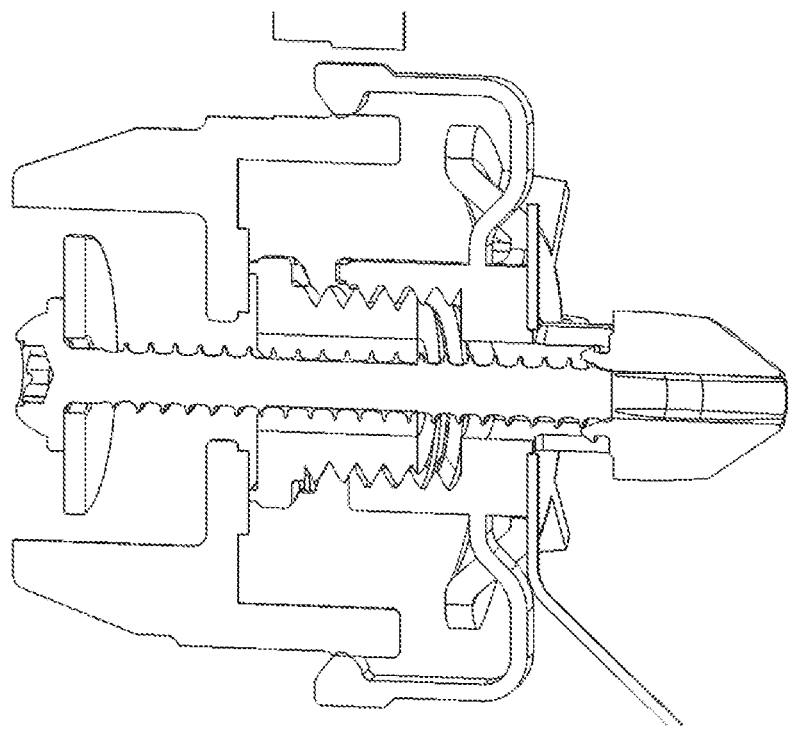
Figure 1G:
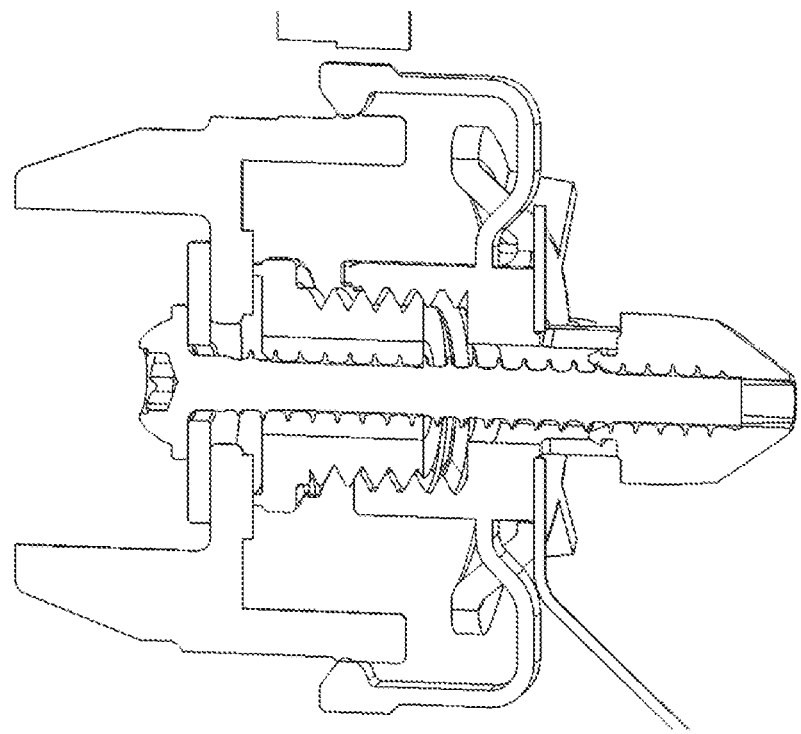
Figure 1H:
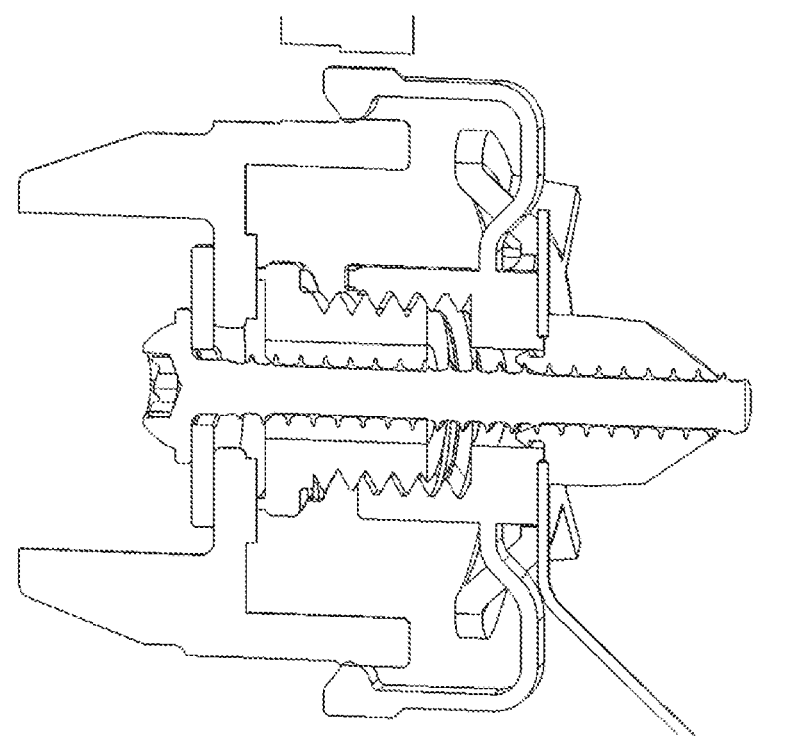
Figure 1I:
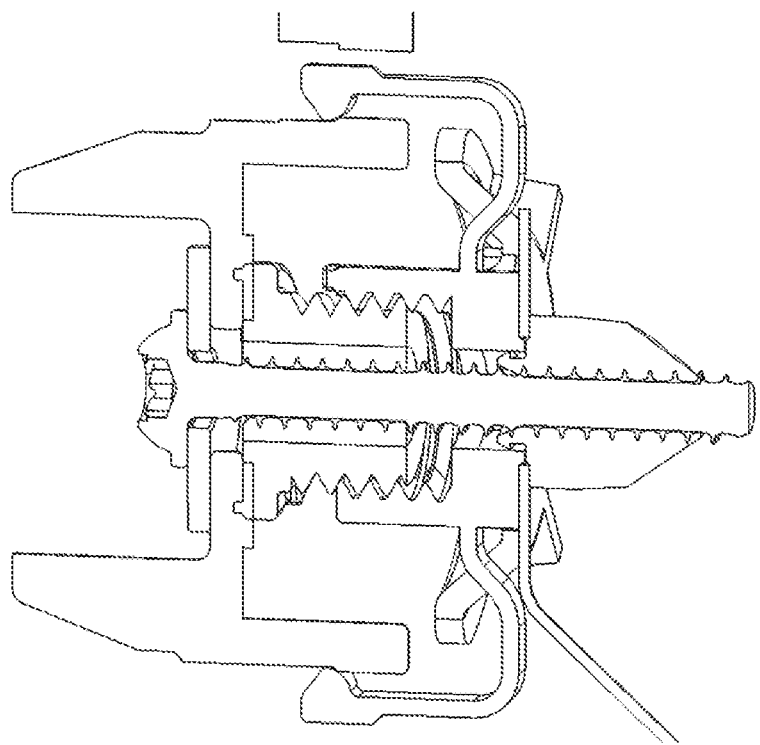

All figure sets (1-7) each show a tolerance compensation fastening apparatus 1 for fastening a first vehicle component 200 to a second vehicle component 300 by means of a bolt 100, the fastening apparatus 1 having a longitudinal opening 2 for receiving the bolt 100, the fastening apparatus 1 having a first compensation unit 10 which is set up to compensate for a tolerance along the longitudinal direction y within a first tolerance compensation range.

Below is the More Detailed Description Concerning FIGS. 1a-l.

The first compensation unit 10 has a first component 11, a movement of the bolt 100 being able to be transmitted to the first component 11 of the first compensation unit 10, by means of a friction element 12 of the first component 11 as a result of friction between the friction element 12 and the bolt 100. The first component 11 is mounted on a second component 21 of the fastening apparatus 1 and is movable in the longitudinal direction y on account of the mounting within the first tolerance compensation range. It therefore has a degree of longitudinal freedom. The fastening apparatus 1 has a second compensation unit 20 which is set up to compensate for a tolerance along the transverse directions x, z. The second compensation unit 20 has for this purpose a plurality of connecting and/or guide elements 22, by means of which the second component 21 can be pre-assembled on the first vehicle component 200 so as to be movable in the direction of the transverse directions x, z within a second tolerance compensation range 200, with the result that a first axial end 3 of the fastening apparatus 1 faces the first vehicle component 200 and therefore the second component 21 has a plurality of transverse degrees of freedom.

The diameter of the fastening apparatus 1 is tapered radially towards a second axial end 4 of the fastening apparatus 1, which second axial end 4 lies opposite the first axial end 3, and starting from a shank section 24 which comes to lie in an opening 301 of the second vehicle component 300 in the fastened state of the fastening apparatus 1, the tapering of the diameter from the shank section 24 to the first axial end 3 being greater than or equal to the second tolerance compensation range. The connecting and/or guide elements 22 are of sprung configuration at least in regions and the second component 21 is arranged in a rest position substantially in a centered manner with regard to the longitudinal axis of the opening 2. The connecting and/or guide elements 22 are configured at least partially as a latching retainer. The first vehicle component 200 and the second component 21 have a plurality of counter-retainers 28, 208 for retaining the plurality of connecting and/or guide elements 22 in a positive locking manner in relation to the one or plurality of transverse directions x, z. The fastening apparatus 1 is set up to fix the degree of longitudinal freedom of the first component 11 and the plurality of degrees of transverse freedom of the second component 21 in a frictional and positive locking manner by means of a pressing force which acts by way of the bolt 100 on the first and second component 11, 21. The fastening apparatus 1 has a ring-shaped rib 14 which is set up to fix the plurality of transverse degrees of freedom in a positive locking manner. The frictional closure is effected by threads 13 and 23 which here are self-locking. The first component 11 is mounted by means of the first thread 13 so as to be rotationally movable on the second component 21 of the fastening apparatus 1 in a second thread 23 of the second component 21. The movement of the bolt 100, which can be transmitted to the first component 11, is a rotation of the bolt 100. Bolt thread and the threads 13, 23 are opposing here—bolt: right-hand thread, thread 13, 23: left-hand thread. The fastening apparatus 1 has a nut element 30 for fastening the fastening apparatus 1 to the second vehicle component 300, the nut element 30 being arranged at a second axial end 4 which is located opposite the first axial end 3 and is set up to be rotated from an introduction position into a locked position, which is defined by a stop, by means of screwing the bolt 100 into the fastening apparatus 1. The second component 21 of the fastening apparatus 1 has guide curves 26 for the axial guiding of the nut element 30.

This is additionally an example of a tolerance compensation fastening apparatus 1 which is distinguished especially by a first compensation unit 10 for the compensation of a tolerance along the longitudinal direction y within a first tolerance range, and by a nut element 30 for fastening the fastening apparatus 1 to an opening 301 of the second vehicle component 300, the nut element 30 being arranged at a second axial end 4 which is situated opposite the first axial end 3 and is set up to be rotated from an introduction position into a locked position, which is defined by a stop, by means of screwing the bolt 100 into the fastening apparatus 1.

The states shown in FIGS. 1b-i are as follows:

1b: put together, mounting on the first vehicle component 200 is effected in said state;

1c: after introduction into the opening 301 of the second vehicle component 300;

1d after the first rotation of the bolt 100—the first component 11 has unscrewed itself from the second component 21;

1e after further rotation of the bolt 100, it creeps up to the nut element 30;

1f as a result of rotating the bolt 100 into the nut element 30, the latter rotates by 45° from the introduction position into the locked position;

1g as a result of further rotation of the bolt 100, it creeps with the bolt head up to the stop on the first vehicle component 200;

1f as a result of further rotation of the bolt 100, the nut element 30 is pulled axially in the direction of the second component 21 and bears against the rear side of the second vehicle component 300;

1i as a result of further rotation of the bolt 100, the rib 14 digs into the second vehicle component 200 and therefore fixes the transverse directions; the threads 13 and 23 are pressed against one another.

Figure 2A:
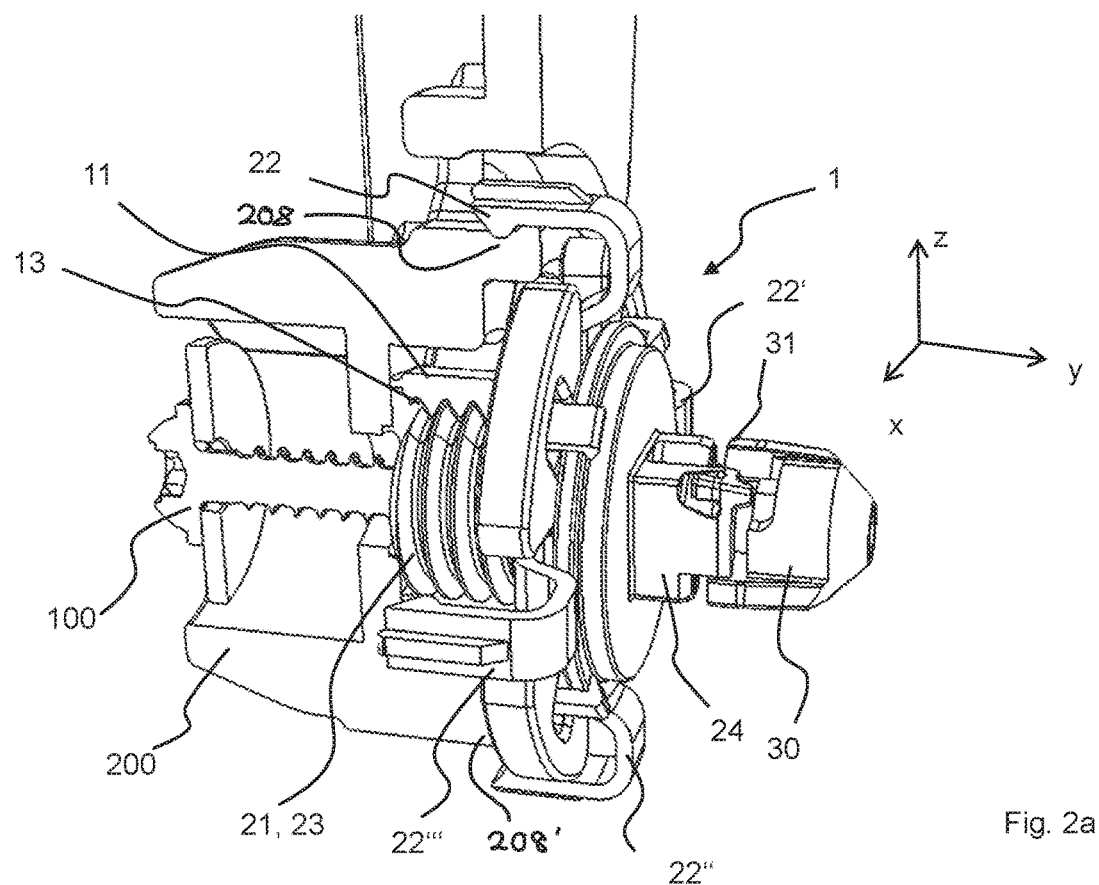
FIGS. 2a-2b show a second apparatus according to the invention.
Figure 2B:
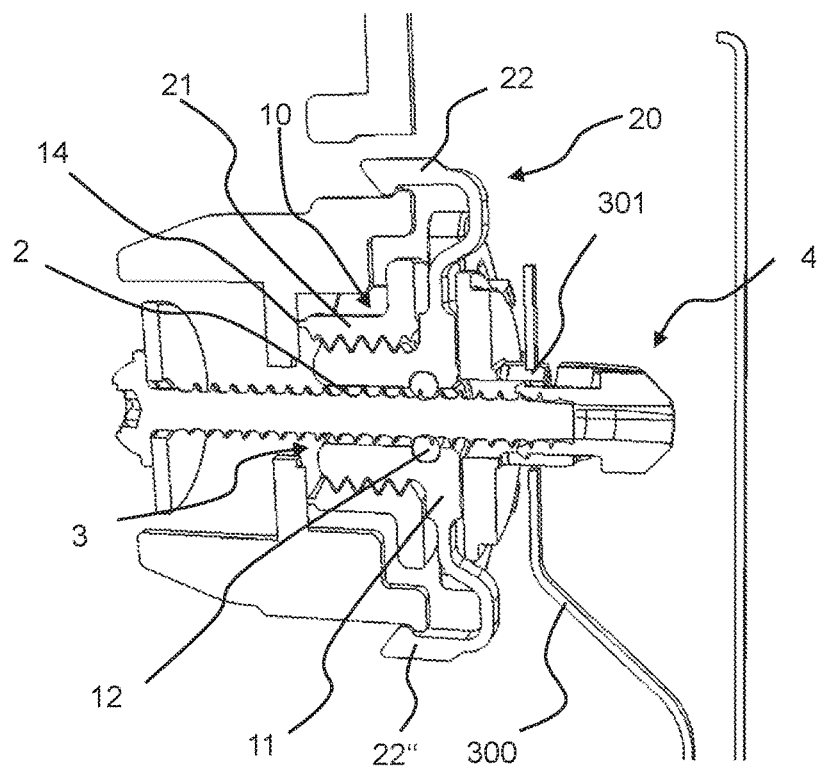

Below is the More Detailed Description Concerning FIGS. 2a-b.

The fastening apparatus 1 is based on the fastening apparatus 1 shown in the preceding figures. In contrast to this, the first component 11 can be pre-assembled on the first vehicle component 200 by means of the connecting and/or guide elements 22 so as to be movable in the direction of the one or the plurality of transverse directions x, z within a second tolerance compensation range. The connecting and/or guide elements 22 are rotated with the first component 11. The thread of the bolt 100 and threads 13 and 23 are unidirectional, i.e. either all right-handed or all left-handed.

Figure 3A:
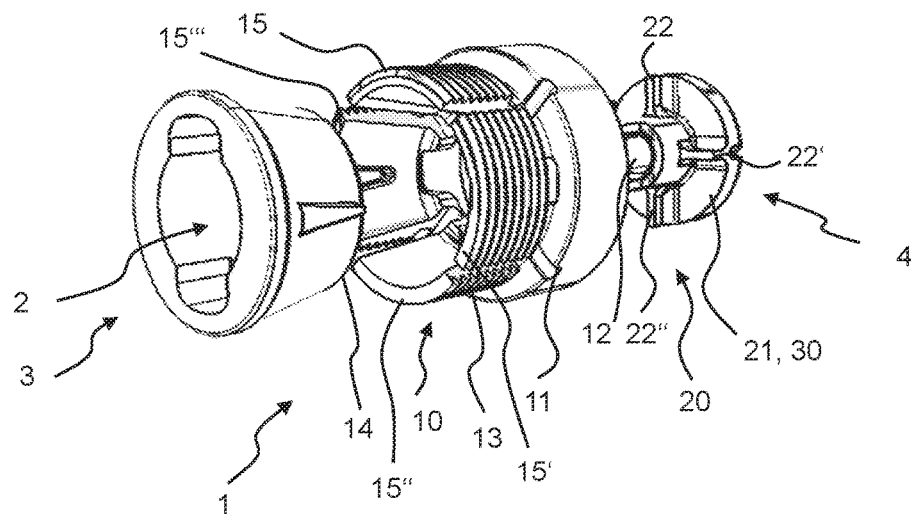
FIGS. 3a-3b show a third apparatus according to the invention, in FIGS. 2b and 3b in each case in the position inserted in the second vehicle component but not yet fastened.
Figure 3B:
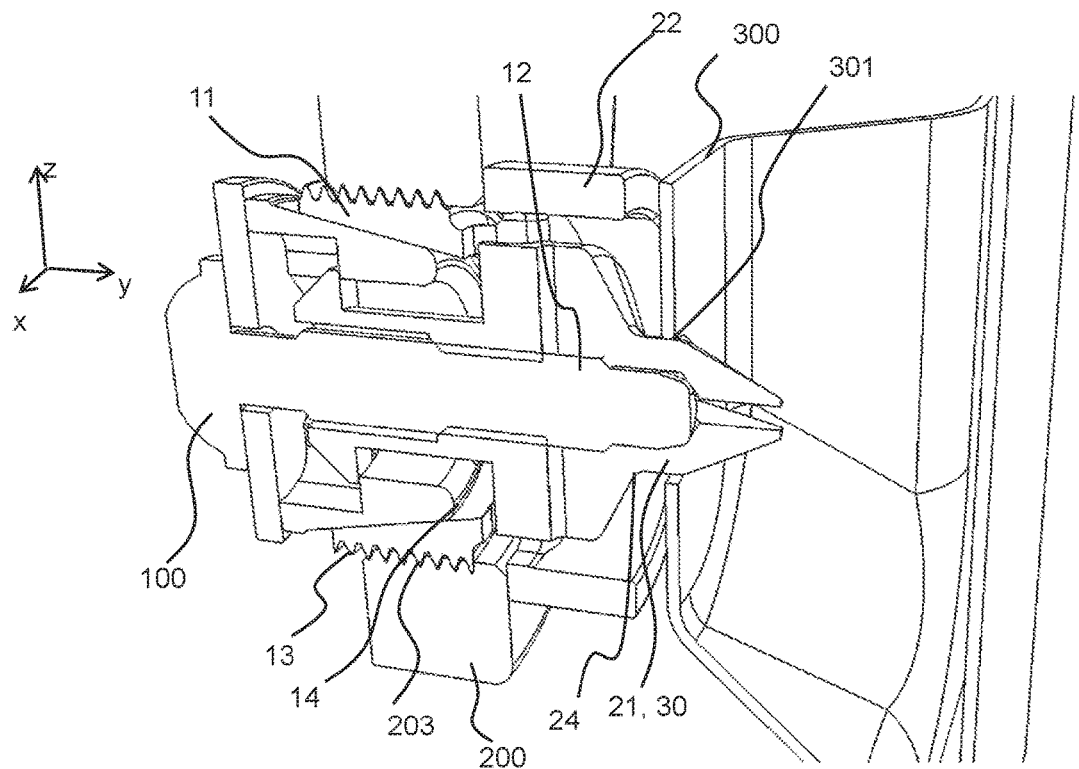
Figure 4A:
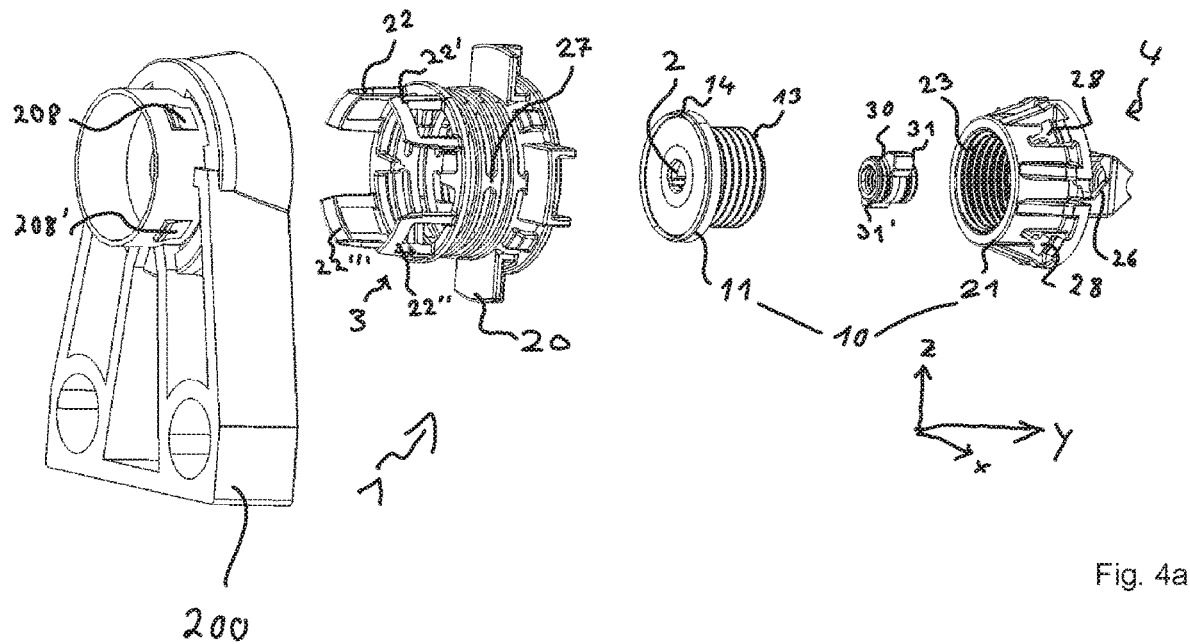
Figure 4B:
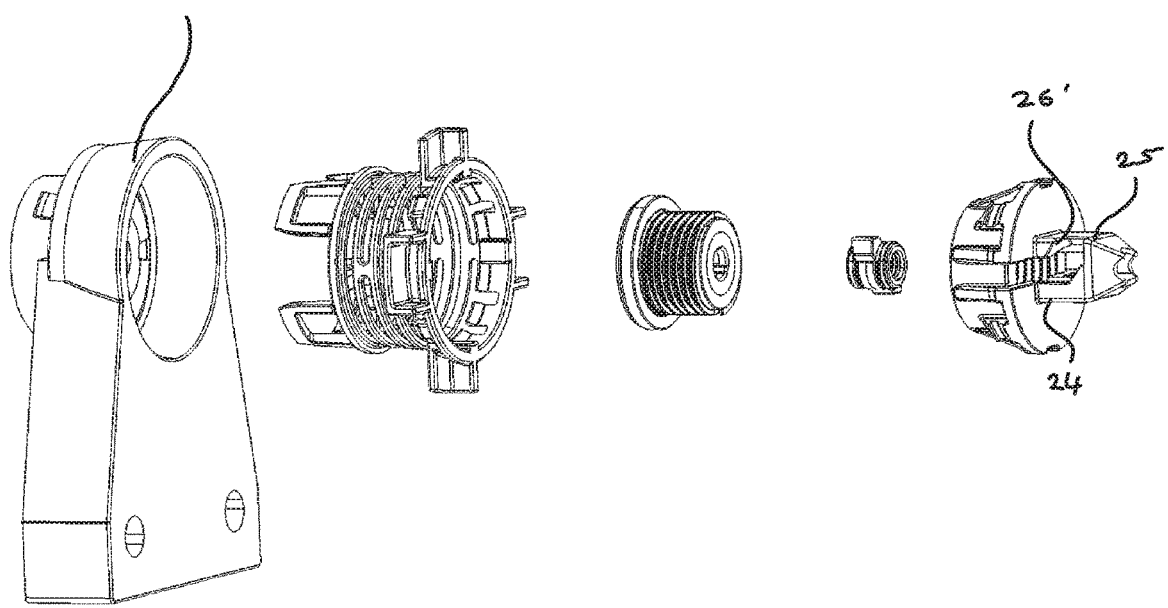
Figure 5A:
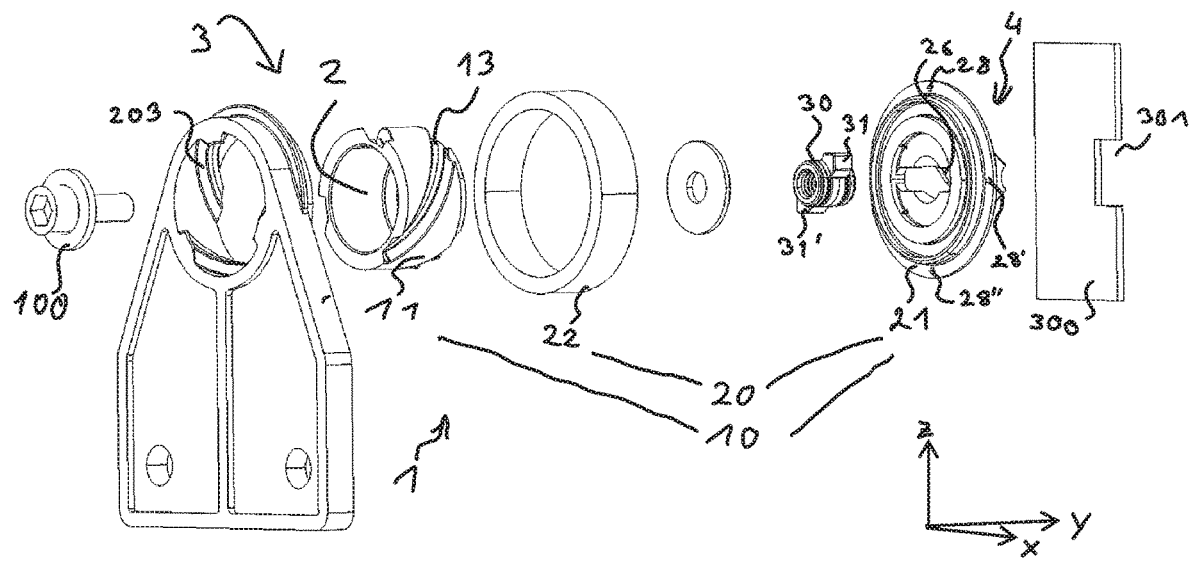
Figure 5B:
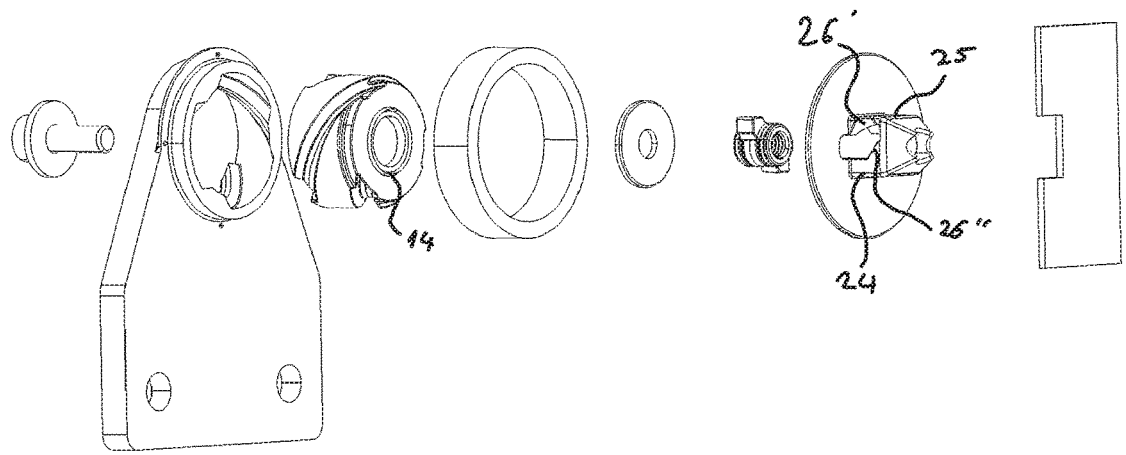
Figure 5F:
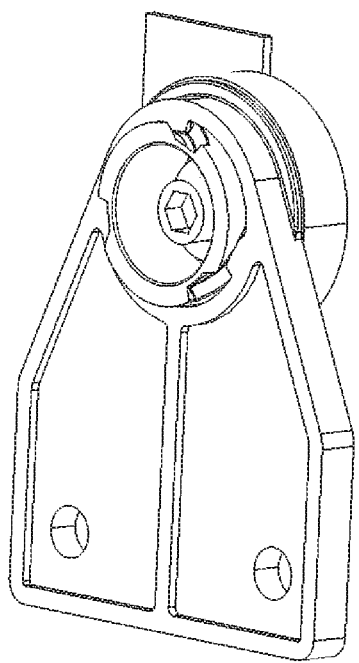
Figure 5G:
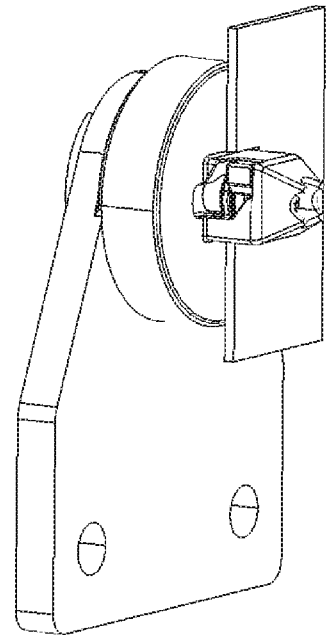
Figure 5H:
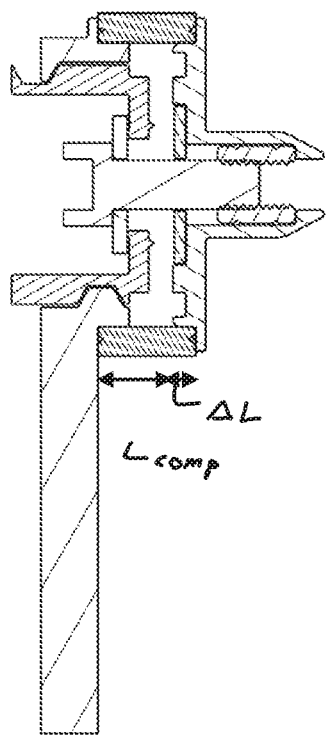
Figure 5I:
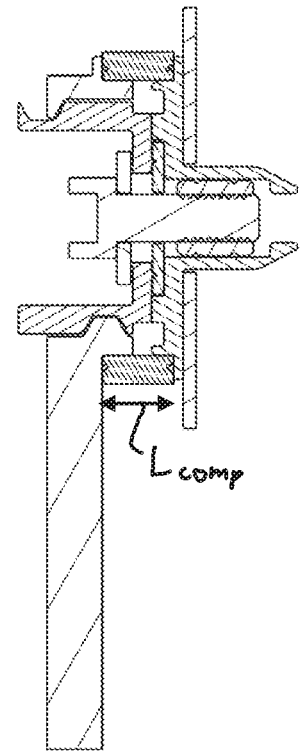

Below is the More Detailed Description Concerning FIGS. 3a-b.

The first compensation unit 10 has a first component 11, a movement of the bolt 100 being able to be transmitted to the first component 11 of the first compensation unit 10, by means of a friction element 12 of the second component 21 as a result of friction between the one or the plurality of friction elements or friction structures 12 and the bolt 100, the fastening apparatus 1 being preassembled via the first component 11 on the first vehicle component 200, by the first component 11 being mounted on the first vehicle component 200 with the result that a first axial end 3 of the fastening apparatus 1 is assigned to the first vehicle component 200, the first component 11 being movable in the mounted state in the longitudinal direction y on account of the mounting within the first tolerance compensation range and therefore having a degree of longitudinal freedom. The fastening apparatus 1 has a second compensation unit 20 which is set up to compensate for a tolerance along the transverse directions x, z, and which for this reason has a plurality of guide elements 22, by means of which a second component 21 of the fastening apparatus 1 is mounted on the first component 11 so as to be movable in the direction of the one or the plurality of transverse directions x, z within a second tolerance compensation range, and therefore the second component 21 has a plurality of degrees of transverse freedom.

The diameter of the fastening apparatus 1 tapers radially towards a second axial end 4 of the fastening apparatus 1, which second axial end 4 lies opposite the first axial end 3, and starting from a shank section 24 which comes to lie in an opening 301 of the second vehicle component 300 in the fastened state of the fastening apparatus 1, the tapering of the diameter from the shank section 24 to the first axial end 3 being greater than or equal to the second tolerance compensation range. The fastening apparatus 1 is set up to fix the degree of longitudinal freedom of the first component 11 and the plurality of degrees of transverse freedom of the second component 21 in a frictionally locking and positively locking manner by means of a pressure force which acts by way of the bolt 100 on the first and second component 11, 21. The first component 11 is mounted in a rotationally movable manner by means of a first thread 13 on the first vehicle component 200 in a second thread of the first vehicle component 203 and the movement of the bolt 100, which can be transmitted to the first component 11 being a rotation of the bolt 100. The fastening apparatus 1 has a plurality of expanding structures 15 which are set up to be expanded by way of the pressure force which acts by way of the bolt 100 on the first and/or second component 11, 21, and thus to block the degree of longitudinal freedom of the thrust joint. The fastening apparatus has a nut element 30 for fastening the fastening apparatus 1 to an opening 301 of the second vehicle component 300, the nut element 30 being arranged at a second axial end 4 which lies opposite the first axial end 3 and being set up to be expanded radially by means of the bolt 100 being screwed into the fastening apparatus 1. The second component 21 and the nut element 30 are realized here in a common component This is additionally an example of a tolerance compensation fastening apparatus 1 which is distinguished especially by a first compensation unit 10 for the compensation of a tolerance along the longitudinal direction y within a first tolerance compensation range, and by a nut element 30 for fastening the fastening apparatus 1 to an opening 301 of the second vehicle component 300, the nut element 30 being arranged at a second axial end 4 which is situated opposite the first axial end 3 and being set up to be radially expanded by means of screwing the bolt 100 into the fastening apparatus 1.

Below is the More Detailed Description Concerning FIGS. 4a-e.

The first compensation unit 10 has a first component 11, a movement of the bolt 100 being able to be transmitted to the first component 11 of the first compensation unit 10 by means of a friction element 12 of the first component 11 as a result of friction between the friction element 12 and the bolt 100 and the first component 11 being mounted on a second component 21 of the fastening apparatus 1, the first component 11 being movable in the longitudinal direction y in the mounted state on account of the mounting within the first tolerance compensation range and therefore having a degree of longitudinal freedom. The fastening apparatus 1 has a second compensation unit 20 which is set up to compensate for a tolerance along the transverse directions x, z, and which for this reason has a plurality of connecting and/or guide elements 22, by means of which the second component 21 can be preassembled on the first vehicle component 200 so as to be movable in the direction of the plurality of transverse directions x, z within a second tolerance compensation range, with the result that a first axial end 3 of the fastening apparatus 1 is assigned to the first vehicle component 200 and therefore the second component 21 has a plurality of degrees of transverse freedom.

The diameter of the fastening apparatus 1 tapers radially towards a second axial end 4 of the fastening apparatus 1, which second axial end 4 lies opposite the first axial end 3, and starting from a shank section 24 which comes to lie in an opening 301 of the second vehicle component 300 in the fastened state of the fastening apparatus 1, the tapering of the diameter from the shank section 24 to the first axial end 3 being greater than or equal to the second tolerance compensation range. The plurality of connecting and/or guide elements 22 being of sprung configuration at least in regions, and the second component 21 being arranged in a rest position substantially in a centered manner with regard to the longitudinal axis. The connecting and/or guide elements 22 are configured as a flexible, hose-like hollow body with a round cross section, are compressible in the longitudinal direction and are formed at least partially by way of a serpentine-like circumferential face 27. The connecting and/or guide elements 22 are configured at least partially as a latching retainer. The first vehicle component 200 and the second component 21 have a plurality of counter-retainers 208, 28 for retaining the connecting and/or guide elements 22 in a positive locking manner in relation to the transverse directions x, z. The fastening apparatus 1 is set up to fix the degree of longitudinal freedom of the first component 11 and the degree of transverse freedom of the second component 21 in a frictionally locking and positively locking manner by means of a pressure force which acts by way of the bolt 100 on the first and/or second component 11, 21. The fastening apparatus 1 has a rib 14 which is set up to fix the degree of transverse freedom in a positive locking manner. The first component 11 is mounted in a second thread 23 of the second component 21 so as to be rotationally movable by means of a first thread 13 on the second component 21 of the fastening apparatus 1 and the movement of the bolt 100, which is able to be transmitted to the first component 11, is a rotation of the bolt 100. The fastening apparatus 1 has a nut element 30 for fastening the fastening apparatus 1 to the second vehicle component 300, the nut element 30 being arranged at a second axial end 4 which lies opposite the first axial end 3 and being set up to be rotated from an introduction position into a locked position, which is defined by a stop, by means of the bolt 100 being screwed into the fastening apparatus 1. The nut element 30 is held in a cage 25 which has a cross section, the nut element 30 having radial projections 31 which, in the introduction position, end radially within the cross section or with an identical radial dimension as the cross section and, in the locked position, project radially beyond the cross section. The cage has a plurality of helix-like guide curves 26 for the axial and/or rotational guidance of the nut element 30, preferably one or a plurality of radial projections 31.

This is additionally an example of a tolerance compensation fastening apparatus 1 which is distinguished especially by a first compensation unit 10 for the compensation of a tolerance along the longitudinal direction y within a first tolerance compensation range, and by a nut element 30 for fastening the fastening apparatus 1 to an opening 301 of the second vehicle component 300, the nut element 30 being arranged at a second axial end 4 which is situated opposite the first axial end 3 and being set up to be rotated from an introduction position into a locked position, which is defined by a stop, by means of screwing the bolt 100 into the fastening apparatus 1.

Below is the More Detailed Description Concerning FIGS. 5a-i.

The first compensation unit 10 has a first component 11, a movement of the bolt 100 preferably being able to be transmitted to the first component 11 of the first compensation unit 10, and the first component 11 being able to be preassembled on the first vehicle component 200 by the first component 11 being mounted on the first vehicle component 200, with the result that a first axial end 3 of the fastening apparatus 1 is assigned to the first vehicle component 200, the first component 11 being movable in the longitudinal direction y in the mounted state on account of the mounting within the first tolerance compensation range and therefore having a degree of longitudinal freedom. The fastening apparatus 1 has a second compensation unit 20 which is set up to compensate for a tolerance along the transverse directions x, z, and which has, for this purpose, a connecting and/or guide element 22, by means of which a second component 21 of the fastening apparatus 1 is mounted on the first component 11 so as to be movable in the direction of the transverse directions x, z within a second tolerance compensation range and therefore the second component 21 has one or a plurality of degrees of transverse freedom.

The diameter of the fastening apparatus 1 tapers radially towards a second axial end 4 of the fastening apparatus 1, which second axial end 4 lies opposite the first axial end 3, and starting from a shank section 24 which comes to lie in an opening 301 of the second vehicle component 300 in the fastened state of the fastening apparatus 1, the tapering of the diameter from the shank section 24 to the first axial end 3 being greater than or equal to the second tolerance compensation range. The connecting and/or guide element 22 is of sprung configuration at least in regions, and the second component 21 is arranged in a rest position substantially in a centered manner with regard to the longitudinal axis of the opening 2. The connecting and/or guide element 22 is configured as a flexible, hose-like hollow body with a round cross section, is compressible in the longitudinal direction (see length amendment ΔL in FIGS. 5h and 5i) and is formed from foam. The first vehicle component 200 and the second component 21 have counter-retainers 208, 28 for retaining the connecting and/or guide elements 22 in a positive locking manner in relation to the transverse directions x, z. The fastening apparatus 1 is set up to fix the degree of transverse freedom of the second component 21 in a positive locking manner by means of a pressure force which acts by way of the bolt 100 on the first and second component 11, 21. The fastening apparatus 1 has a rib 14 which is set up to fix the degree of transverse freedom in a positive locking manner. The first component 11 is, by means of a first thread 13, mounted so as to be rotationally movable on the first vehicle component 200 in a second thread of the vehicle component 203, and the movement of the bolt 100, which can be transmitted to the first component 11, is a rotation of the bolt 100. The first component 11 is mounted on the first vehicle component 200 by means of a thrust joint with the result that it can be displaced along the degree of longitudinal freedom, the movement of the bolt 100 which can be transmitted to the first component 11 being a displacement of the bolt 100 in the longitudinal direction. As the threads 23 and 203 are not self-locking, the mounting of the first component 11 on the first vehicle component is a thrust-rotational joint. The fastening apparatus 1 has a nut element 30 for fastening the fastening apparatus 1 to the second vehicle component 300, the nut element 30 being arranged at a second axial end 4 which lies opposite the first axial end 3 and being set up to be rotated from an introduction position into a locked position, which is defined by a stop, by means of the bolt 100 being screwed into the fastening apparatus 1. The nut element 30 is held in a cage 25 which has a cross section, the nut element 30 having radial projections 31 which, in the introduction position, end radially within the cross section or with an identical radial dimension as the cross section and, in the locked position, project radially beyond the cross section. The cage has a plurality of helix-like guide curves 26 for the axial and/or rotational guidance of the nut element 30, preferably one or a plurality of radial projections 31.

This is additionally an example of a tolerance compensation fastening apparatus 1 which is distinguished especially by a first compensation unit 10 for the compensation of a tolerance along the longitudinal direction y within a first tolerance compensation range, and by a nut element 30 for fastening the fastening apparatus 1 to an opening 301 of the second vehicle component 300, the nut element 30 being arranged at a second axial end 4 which is situated opposite the first axial end 3 and being set up to be rotated from an introduction position into a locked position, which is defined by a stop, by means of screwing the bolt 100 into the fastening apparatus 1.

This is additionally an example of a tolerance compensation fastening apparatus 1 which is distinguished especially by a first compensation unit 10 for the compensation of a tolerance along the longitudinal direction y within a first tolerance compensation range, and in that, the first component 11 is mounted in a second thread of the vehicle component 203 so as to be rotationally movable on the first vehicle component 200 by means of a first thread 13, the first and second threads 13, 23 being configured in such a manner that they do not bring about any self-locking and therefore form a thrust joint along the degree of longitudinal freedom, and the movement of the bolt 100, which is able to be transmitted to the first component 11, is a rotation of the bolt 100 and/or a displacement of the bolt 100 in the longitudinal direction.

Below is the More Detailed Description Concerning FIGS. 6a-d.

The fastening apparatus 1 is based on the fastening apparatus 1 shown in preceding FIGS. 5a-5i. In contrast to this, a plurality of connecting and/or guide elements 22 are present and they are configured as double flight spiral springs.

Below is the More Detailed Description Concerning FIGS. 7a-d.

Figure 6A:
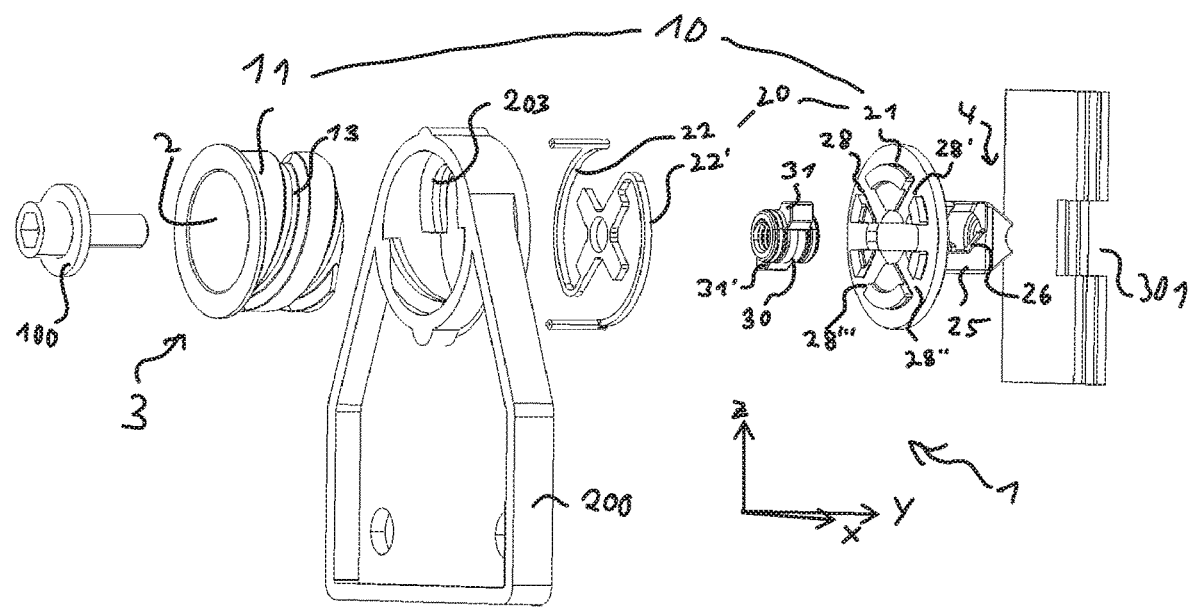
FIGS. 6a-6d show various perspective representations of a sixth apparatus according to the invention, FIG. 6c showing once the support of the connecting and/or guide elements on the first vehicle component and FIG. 6d showing once the support of the connecting and/or guide elements on the second component.
Figure 6B:
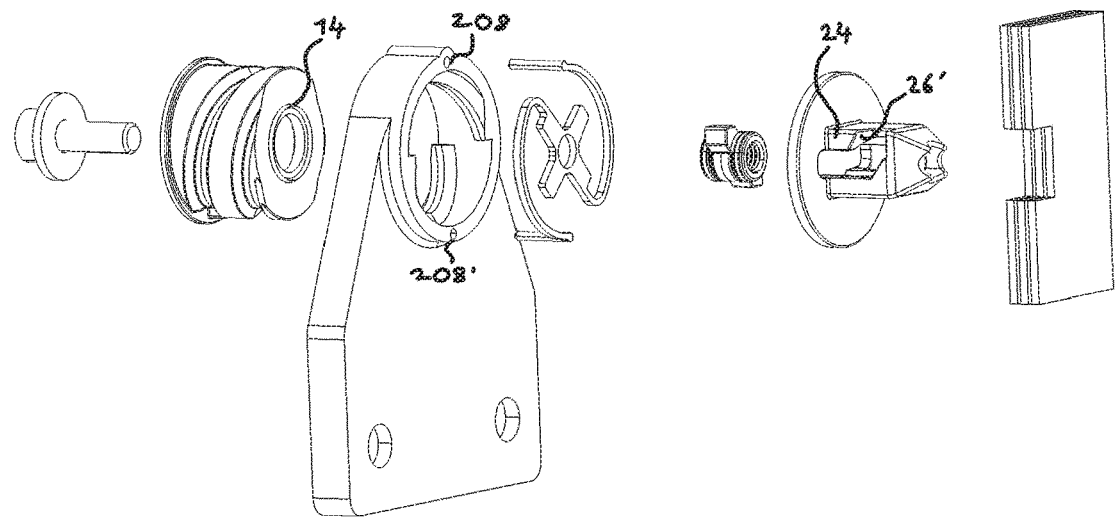
Figure 6C:
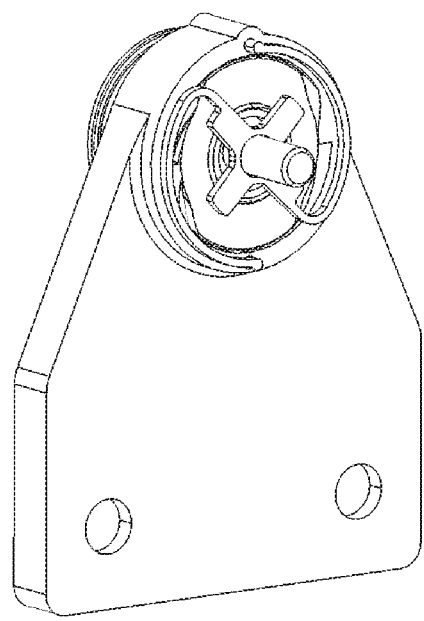
Figure 6D:
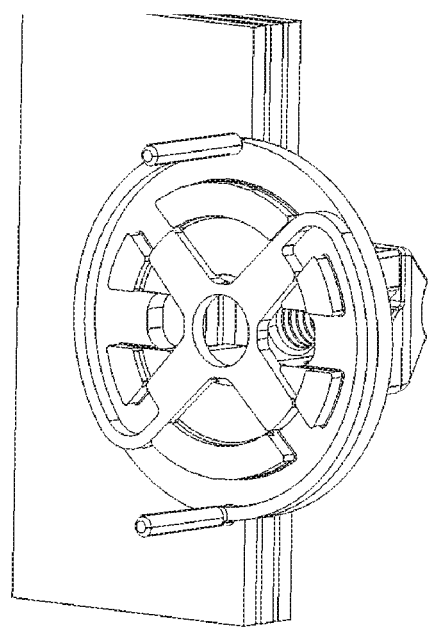
Figure 7A:
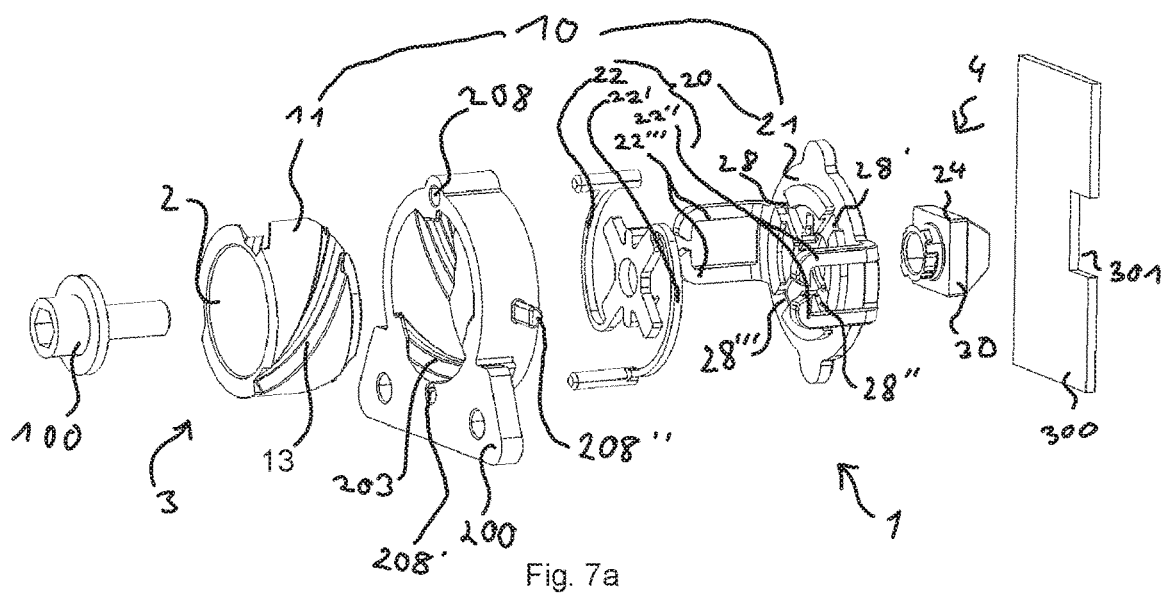
FIGS. 7a-7d show various perspective representations of a seventh apparatus according to the invention.
Figure 7B:
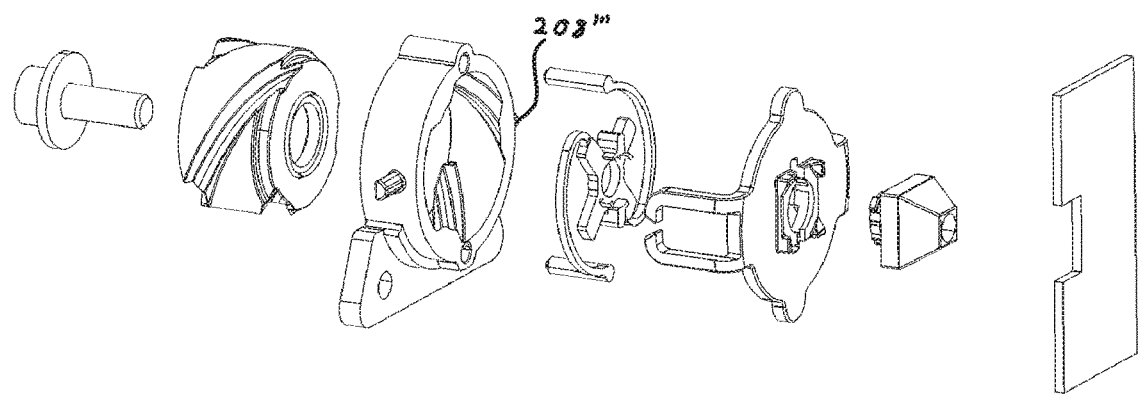
Figure 7C:
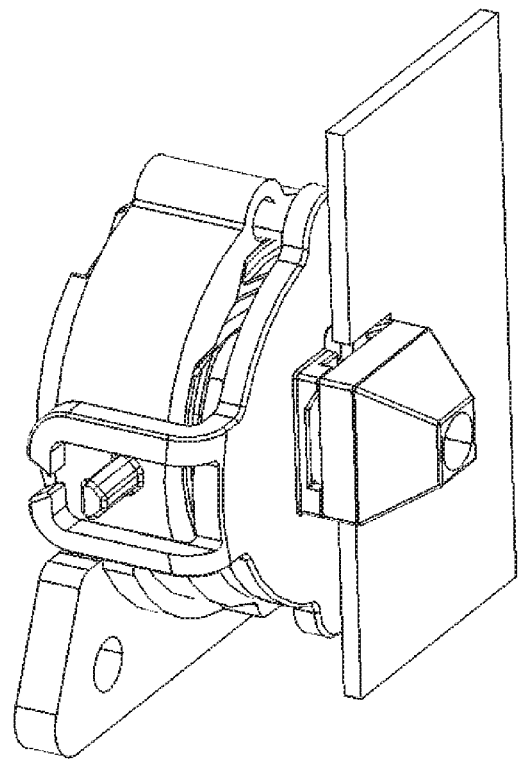
Figure 7D:
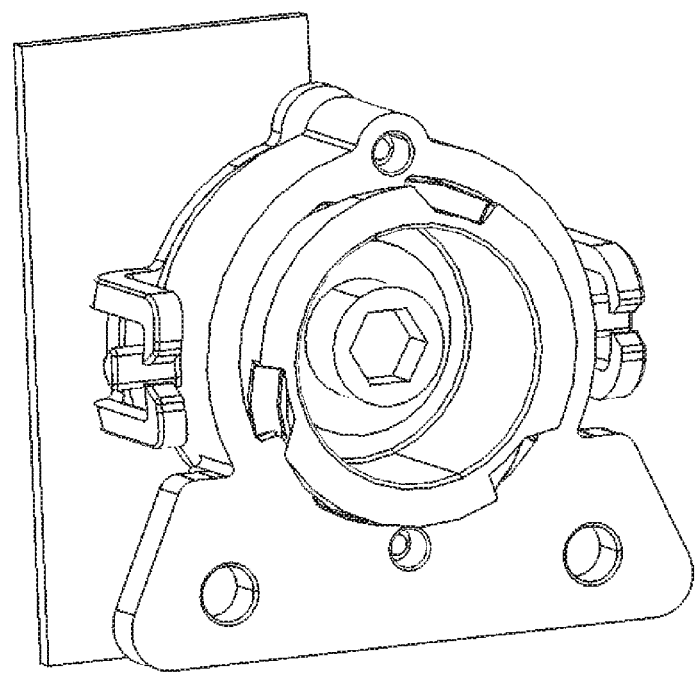
Figure 8A:
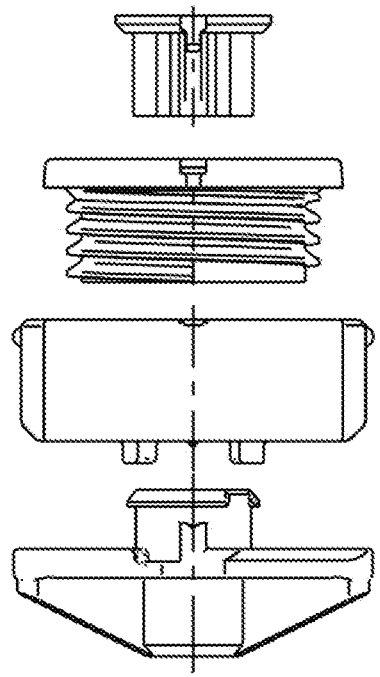
FIGS. 8a-8g show various states, perspectives and sections of an eighth apparatus according to the invention.
Figure 8B:
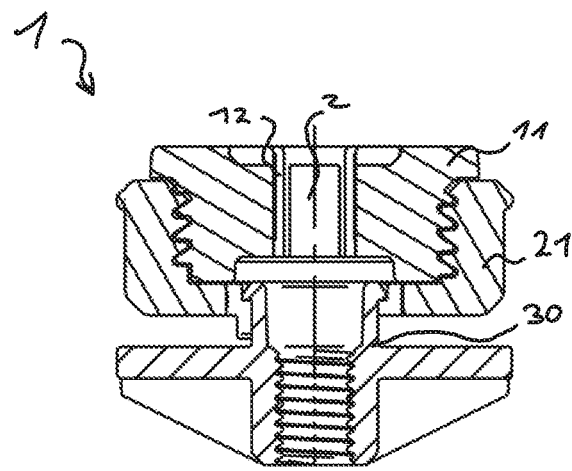
Figure 8C:
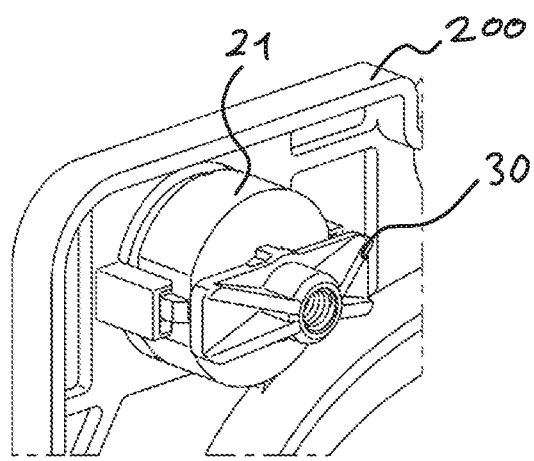
Figure 8D:
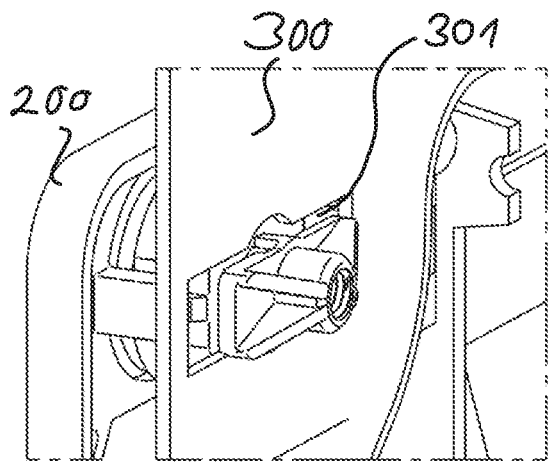
Figure 8E:
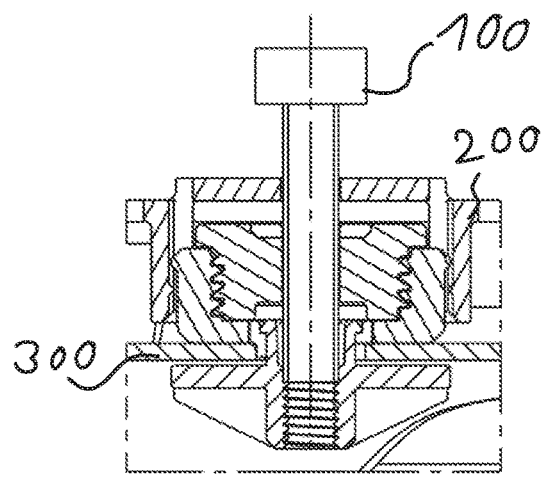
Figure 8F:
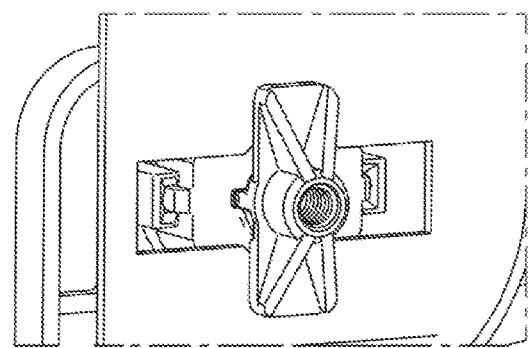
Figure 8G:
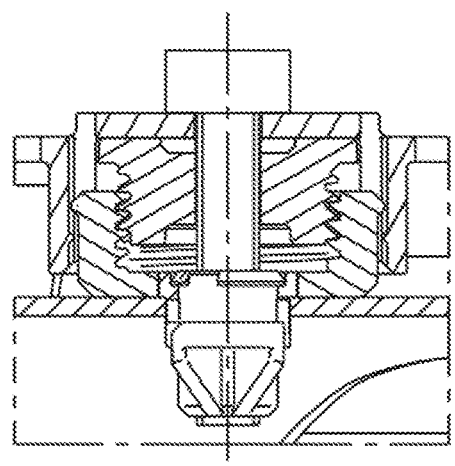

The fastening apparatus 1 is based on the fastening apparatus 1 shown in preceding FIGS. 6a-5d. In contrast to this, connecting and/or guide elements 22″, 22‴ are present which are configured as latching retainers. The counter retainers 208″ and 208‴ are configured as projections and serve as supports for said latching retainers, not in a positive locking manner as a freedom of movement is present that is equal to or greater than the tolerance range in the directions x, y and z. In addition, the nut element 30 is not held in a cage.

Below is the More Detailed Description Concerning FIG. 8a-g.

The first compensation unit 10 has a first component 11, a movement of the bolt 100 being able to be transmitted to the first component 11 of the first compensation unit 10, preferably by means of a friction element 12 of the first component 11 as a result of friction between the friction element 12 and the bolt 100, the first component 11 being mounted on a second component 21 of the fastening apparatus 1, the first component 11 being movable in the longitudinal direction y in the mounted state on account of the mounting within the first tolerance compensation range and therefore having a degree of longitudinal freedom. The fastening apparatus 1 having a nut element 30 for fastening the fastening apparatus 1 to an opening 301 of the second vehicle component 300, the nut element 30 being arranged at a second axial end 4 which lies opposite the first axial end 3, and being set up to be rotated from an introduction position into a locked position, which is defined by a stop, by means of the bolt 100 being screwed into the fastening apparatus 1.

The first component 11 is mounted in a rotationally movable manner by means of a first thread 13 on the second components 21 of the fastening apparatus 1 in a second thread 23 of the second component 21 and the movement of the bolt 100, which can be transmitted to the first component 11, is a rotation of the bolt 100. The nut element 30 has an elongate cross section, with the result that it can be introduced into an opening 301 of correspondingly elongate shape of the second vehicle component 300 and is therefore set up to undercut said opening 301 transversely in the locked position rotated by 90° with respect to the introduction position and therefore to lock it. The second component 21 of the fastening device 1 has a guide curve 26 for the axial and/or rotational guidance of the nut element 30.

Below is the More Detailed Description Concerning FIGS. 9a-e.

The fastening system comprising a fastening apparatus 1 according to one of the preceding claims, here one that is similar to that shown in FIGS. 5a-h, a first vehicle component 200, a second vehicle component 300 and a bolt 100, the second vehicle component 300 having a first centering element 302, and the first vehicle component 200 having a second centering element 202 which can be brought into contact with the first centering element 302, and the correct installation situation or the y and z direction being defined when the first and second centering elements 302, 202 bear against one another. The fastening system is set up to cut into the fastening apparatus 1 (by means of the ring-shaped rib 14, see transition from FIGS. 9c to 9d) up to a predefined dimension by way of a pressure force which is applied by means of the bolt head of the bolt 100 to the composite structure comprising the vehicle components 200, 300, or to deform the fastening apparatus 1 up to a predefined dimension, with the result that the longitudinal extent of the composite structure comprising the vehicle components 200, 300 and the fastening apparatus 1 is reduced by a predefined dimension, and the centering elements 202, 302 move away from one another again by a predefined dimension at least in the longitudinal direction. The first vehicle component 200 is a door handle module and the second vehicle component 300 is a vehicle door with an outer skin and with a cut-out 303 in the outer skin for a door handle of the door handle module, the first centering element 302 being arranged at a spacing of less than 1 cm from the edge of the cut-out 303—it forms an edge region of the cutout 303 here.

Figure 9A:
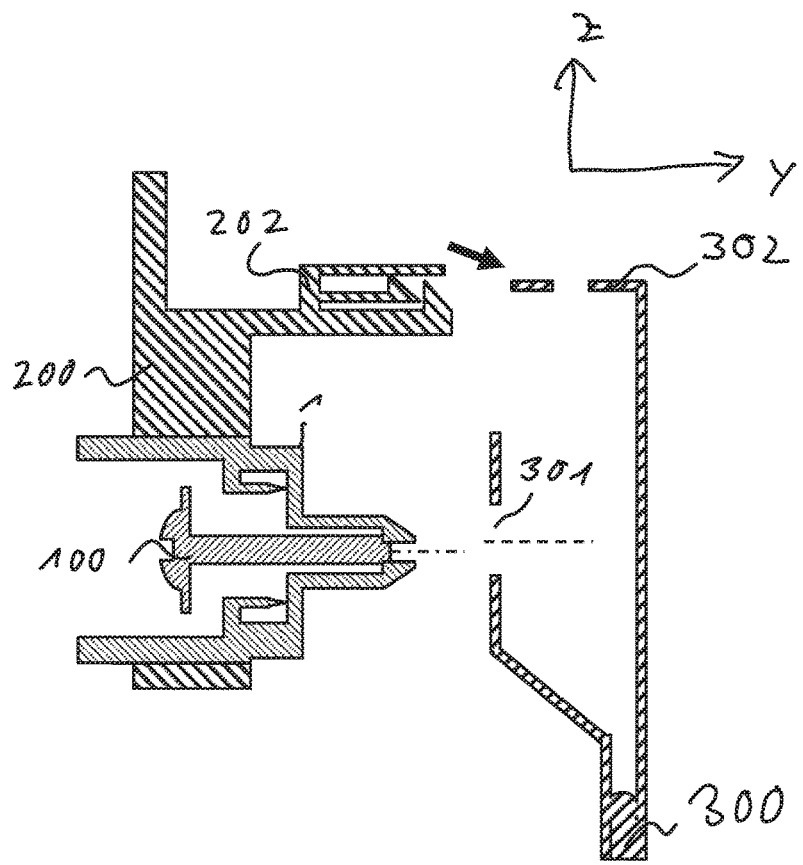
FIGS. 9a-9e show sectional views of a representation of a fastening system and a fastening method according to the invention.
Figure 9B:
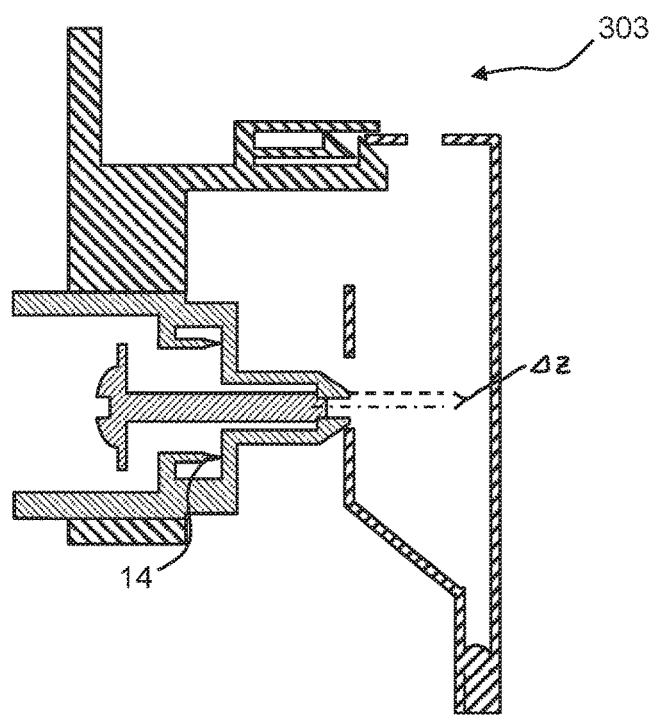
Figure 9C:
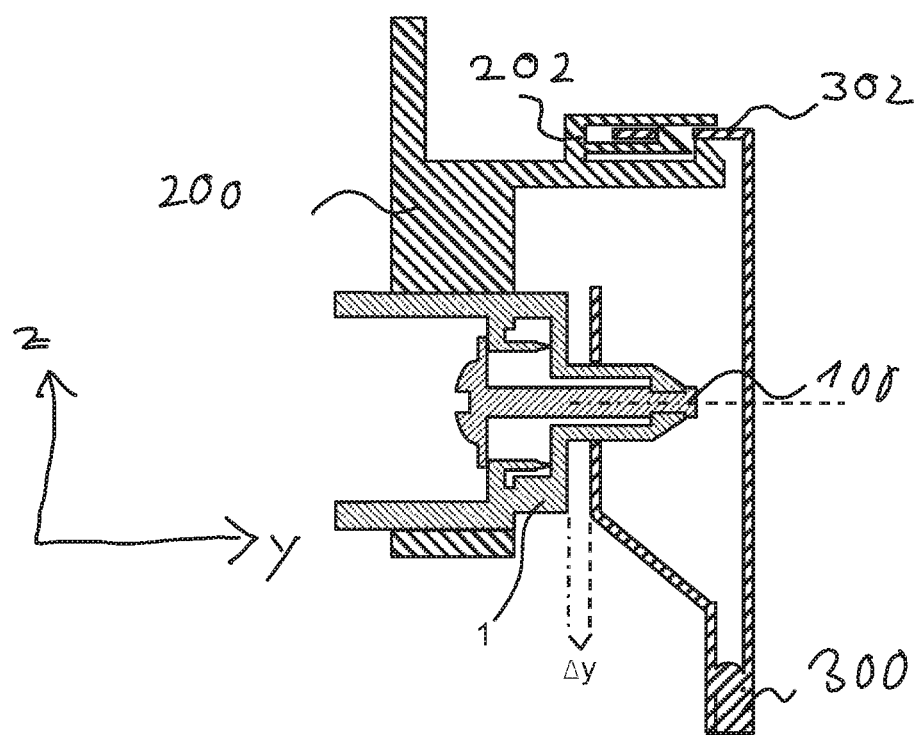
Figure 9D:
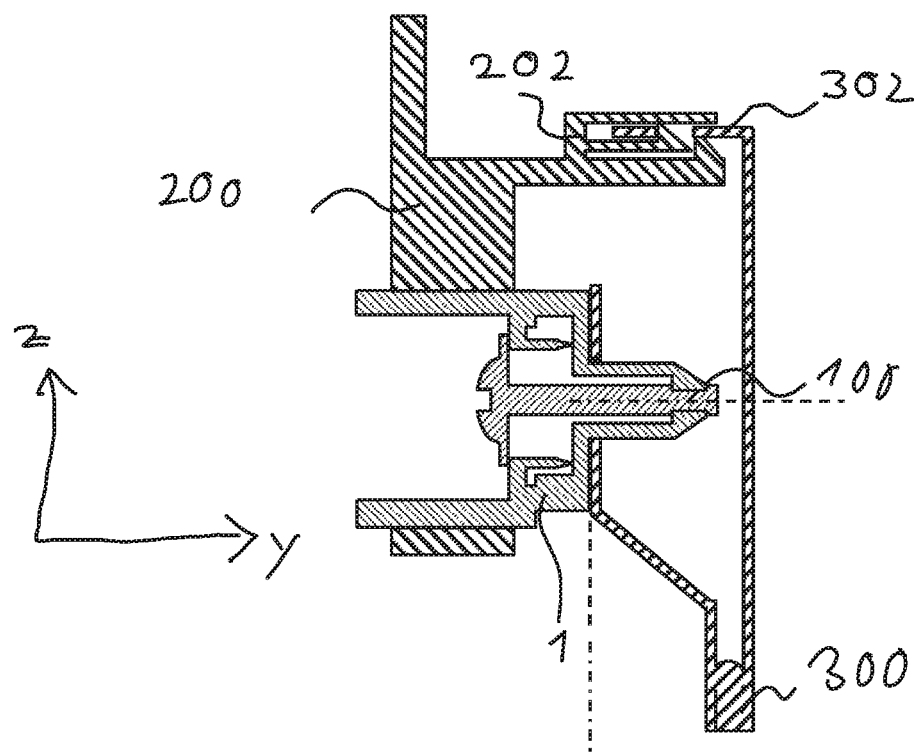
Figure 9E:
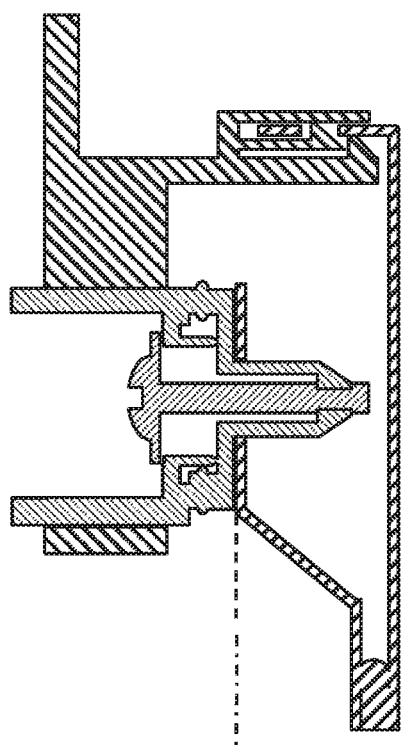

The fastening of the first vehicle component 200 to the second vehicle component 300 by means of the fastening apparatus 1 is effected in the following steps:

preassembling of the fastening apparatus 1 on the first vehicle component 200 (see FIG. 9a).

bringing the first centering element 302 into contact (see FIG. 9a→FIG. 9b→FIG. 9c) with the second centering element 202, fastening of the first vehicle component 200 to the second vehicle component 300 by way of the bolt 100 being screwed into the fastening apparatus 1 (FIG. 9b→FIG. 9c), a tolerance Δy being compensated for here along the longitudinal direction y within a first tolerance compensation range by means of a first compensation unit 10 of the fastening apparatus 1.

As a result of bringing the first and second centering elements 302, 202 into contact and fastening the first vehicle component 200 to the second vehicle component 300 by screwing the bolt 100 into the fastening apparatus 1, a tolerance Δz is compensated for along transverse directions z within a second tolerance compensation range.

The bolt 100 is tightened at the end of the method and in the process cuts into the fastening apparatus 1 up to a predefined dimension by way of a pressure force which is applied by means of the bolt head of the bolt 100 to the composite structure comprising the vehicle components 200, 300 and the fastening apparatus 1, and the fastening apparatus 1 is deformed up to a predefined dimension, as a result of which the longitudinal extent of the composite structure comprising the vehicle components 200, 300 and the fastening apparatus 1 is reduced by a predefined dimension, and therefore the centering elements 302, 202 move away from one another again by a predefined dimension in the longitudinal direction y.

LIST OF REFERENCES

| | |
|---|---|
| 1 | Fastening apparatus |
| 2 | Longitudinal opening |
| 3 | First axial end |
| 4 | Second axial end |
| 10 | First compensation unit |
| 11 | First component |
| 12 | Friction element or friction structure |
| 13 | First thread |
| 14 | Rib or prong |
| 15 | Expanding structure |
| 20 | Second compensation unit |
| 21 | Second component |
| 22 | Connecting and/or guide element |
| 23 | Second thread |
| 24 | Shank section |
| 25 | Cage |
| 26 | Guide curve |
| 27 | Serpentine-like circumferential face |
| 28 | Counter-retainer |
| 30 | Nut element |
| 31 | Radial projection |
| 100 | Bolt |
| 200 | First vehicle component |
| 202 | Second centering element |
| 203 | Second thread |
| 208 | Counter support |
| 300 | Second vehicle component |
| 301 | Opening |
| 302 | First centering element |
| 303 | Cutout |
| x | Transverse direction or radial direction |
| y | Longitudinal direction or axial direction |
| z | Transverse direction or radial direction |

The invention claimed is:

1. A tolerance compensation fastening apparatus for fastening a first vehicle component to a second vehicle component by means of a bolt, the fastening apparatus having a longitudinal opening for receiving the bolt, the fastening apparatus having a first compensation unit
   which is set up to compensate for a tolerance along the longitudinal direction within a first tolerance compensation range,
   and which has, for this purpose, a first component, and
   a) the first component being mounted on a second component of the fastening apparatus, or
   b) the fastening apparatus being preassembled via the first component on the first vehicle component, by the first component being mounted on the first vehicle component,
the first component being movable, in the respective mounted state, in the longitudinal direction on account of the mounting within the first tolerance compensation range, and therefore having a degree of longitudinal freedom,
wherein
the fastening apparatus has a second compensation unit
   which is set up to compensate for a tolerance along one or more transverse directions,
   and which has, for this purpose, one or more connecting and/or guide elements, by means of which,
      in case a), the second component or the first component can be preassembled on the first vehicle component with the result that it can be moved in the direction of the one or more transverse directions within a second tolerance compensation range, with the result that a first axial end of the fastening apparatus faces the first vehicle component, or, in case b), a second component of the fastening apparatus is mounted on the first component or another component of the fastening apparatus with the result that it can be moved in the direction of the one or more transverse directions within a second tolerance compensation range, and the second component therefore has one or more degrees of transverse freedom.

2. The fastening apparatus according to claim 1, the diameter of the fastening apparatus tapering radially towards a second axial end of the fastening apparatus, which second axial end lies opposite the first axial end, and starting from a shank section which comes to lie in an opening of the second vehicle component in the fastened state of the fastening apparatus, the tapering of the diameter from the shank section to the first axial end being greater than or equal to the second tolerance compensation range.

3. The fastening apparatus according to claim 1, the one or the plurality of connecting and/or guide elements being of sprung configuration at least in regions, and the second component being arranged in a rest position substantially in a centered manner with regard to the longitudinal axis.

4. The fastening apparatus according to claim 1, the one or the plurality of connecting and/or guide elements being configured as a flexible, hose-shaped hollow body with a round or angular cross section.

5. The fastening apparatus according to claim 4, it being possible for the one or the plurality of connecting and/or guide elements to be compressed in the longitudinal direction.

6. The fastening apparatus according to claim 5, the one or the plurality of connecting and/or guide elements being formed at least partially from foam.

7. The fastening apparatus according claim 5, the one or the plurality of connecting and/or guide elements being formed at least partially by way of a serpentine-shaped circumferential face.

8. The fastening apparatus according to claim 1, the one or the plurality of connecting and/or guide elements being configured at least partially as a spiral spring.

9. The fastening apparatus according claim 1, the one or the plurality of connecting and/or guide elements being configured at least partially as a latching retainer.

10. The fastening apparatus according to claim 1, the first vehicle component and/or the second component having one or a plurality of counter-retainers for retaining the one or plurality of connecting and/or guide elements.

11. The fastening apparatus according to claim 1, the fastening apparatus being set up to fix the degree of longitudinal freedom of the first component and/or the one or the plurality of degrees of transverse freedom of the second component in a frictionally locking and/or positively locking manner by means of a pressure force which acts by way of the bolt on the first and/or second component.

12. The fastening apparatus according to claim 11, the fastening apparatus having one or more ribs or prongs which are set up to fix the degree of longitudinal freedom and/or the one or the plurality of degrees of transverse freedom in a frictionally locking and/or positively locking manner.

13. The fastening apparatus according to claim 1, the first component being mounted in a rotationally movable manner by means of a first thread, in case a), on the second component of the fastening apparatus in a second thread of the second component, or, in case b), on the first vehicle component in a second thread of the vehicle component, and the movement of the bolt which can be transmitted to the first component being a rotation of the bolt.

14. The fastening apparatus according to claim 1, the first component being mounted with the result that it can be displaced along the degree of longitudinal freedom by means of a thrust joint, in case a), on the second component of the fastening apparatus, or, in case b), on the first vehicle component, and the movement of the bolt which can be transmitted to the first component being a displacement of the bolt in the longitudinal direction.

15. The fastening apparatus according to claim 14, the fastening apparatus having one or more expanding structures which is/are set up to be expanded by way of the pressure force which acts by way of the bolt on the first and/or second component, and thus to block the degree of longitudinal freedom of the thrust joint.

16. The fastening apparatus according to claim 1, the fastening apparatus having a nut element for fastening the fastening apparatus to an opening of the second vehicle component, the nut element being arranged at a second axial end which lies opposite the first axial end, and being set up to be expanded radially by means of the bolt being screwed into the fastening apparatus.

17. The fastening apparatus according to claim 1, the fastening apparatus having a nut element for fastening the fastening apparatus to the second vehicle component, the nut element being arranged at a second axial end which lies opposite the first axial end, and being set up to be rotated by means of the bolt being screwed into the fastening apparatus from an introduction position into a locked position which is defined by way of a stop.

18. The fastening apparatus according to claim 17, the nut element having an elongate cross section, with the result that it can be introduced into an opening of correspondingly elongate shape of the second vehicle component and is therefore set up to transversely undercut the said opening and therefore to lock it in the blocked position.

19. The fastening apparatus according to claim 18, the nut element being held in a cage which has a cross section, the nut element having radial projections which, in the introduction position, end radially within the cross section or with an identical radial dimension as the cross section and, in the locked position, project radially beyond the cross section.

20. The fastening apparatus according to claim 19, the cage or another component of the fastening device having one or more guide curves for the axial and/or rotational guidance of the nut element.

21. A fastening system comprising a fastening apparatus according to claim 1, a first vehicle component, a second vehicle component and a bolt, the second vehicle component having one or more first centering elements, and the first vehicle component having one or more second centering elements which can be brought into contact with the first centering elements, and the correct installation situation being defined when the first and second centering elements bear against one another.

22. The fastening system according to claim 21, the fastening system being set up to cut into the fastening apparatus or into the first or the second vehicle component up to a predefined dimension by way of a pressure force which is applied by means of the bolt head of the bolt to the composite structure comprising the vehicle components and the fastening apparatus, or to deform the fastening apparatus or the first or the second vehicle component up to a predefined dimension, with the result that the longitudinal extent of the composite structure comprising the vehicle components and the fastening apparatus is reduced by a predefined dimension, and one or more centering elements move away from one another again by a predefined dimension at least in the longitudinal direction.

23. The fastening system according to claim 21, the first vehicle component being a door handle module, and the second vehicle component being a vehicle door with an outer skin and with a cut-out in the outer skin for a door handle of the door handle module, the one or the plurality of first centering elements being arranged at a spacing of less than 1 cm from the edge of the cut-out.

24. The fastening apparatus of claim 1, the fastening apparatus having a nut element for fastening the fastening apparatus to the second vehicle component and being arranged at a second axial end which lies opposite the first axial end.

25. A tolerance compensation fastening apparatus for fastening a first vehicle component to a second vehicle component by means of a bolt, the fastening apparatus having a longitudinal opening for receiving the bolt,
the fastening apparatus having a first compensation unit which is set up to compensate for a tolerance along the longitudinal direction within a first tolerance compensation range,
and which has, for this purpose, a first component and
a) the first component being mounted on a second component of the fastening apparatus, or
b) the fastening apparatus being preassembled via the first component on the first vehicle component, by the first component being mounted on the first vehicle component,
the first component being movable, in the respective mounted state, in the longitudinal direction on account of the mounting within the first tolerance compensation range, and therefore having a degree of longitudinal freedom,
wherein
the fastening apparatus has a nut element for fastening the fastening apparatus to an opening of the second vehicle component, the nut element being arranged at a second axial end which lies opposite the first axial end, and being set up to be expanded radially by means of the bolt being screwed into the fastening apparatus, or to be rotated by means of the bolt being screwed into the fastening apparatus from an introduction position into a locked position which is defined by way of a stop.

26. A tolerance compensation fastening apparatus for fastening a first vehicle component to a second vehicle component by means of a bolt, the fastening apparatus having a longitudinal opening for receiving the bolt,
the fastening apparatus having a first compensation unit which is set up to compensate for a tolerance along the longitudinal direction within a first tolerance compensation range,
and which has a first component for this purpose, and
a) the first component being mounted on a second component of the fastening apparatus, or
b) the fastening apparatus being pre-mounted via the first component on the first vehicle component, by the first component being mounted on the first vehicle component,
the first component being movable, in the respective mounted state, within the first tolerance compensation range in the longitudinal direction on account of the mounting, and therefore having a degree of longitudinal freedom,
wherein
the first component is mounted by means of a first thread in a rotationally movable manner,
in case a), on the second component of the fastening apparatus in a second thread of the second component, or,
in case b), on the first vehicle component in a second thread of the vehicle component,
and the first and second thread being configured in such a way that they do not bring about a self-locking action and therefore form a thrust joint along the degree of longitudinal freedom,
and the movement of the bolt which can be transmitted to the first component being a rotation of the bolt and/or a displacement of the bolt in the longitudinal direction.

27. A method for fastening a first vehicle component to a second vehicle component by means of a fastening apparatus, comprising the following steps:
preassembling of the fastening apparatus on the first vehicle component,
bringing first centering elements of the second vehicle component into contact with second centering elements of the first vehicle component,
fastening of the first vehicle component to the second vehicle component by way of the bolt being screwed into the fastening apparatus, a tolerance being compensated for here along the longitudinal direction within a first tolerance compensation range by means of a first compensation unit of the fastening apparatus,
characterized in that
a tolerance is compensated for along one or more transverse directions within a second tolerance compensation range by way of the first and second centering elements being brought into contact, and by way of the first vehicle component being fastened to the second vehicle component by way of the bolt being screwed into the fastening apparatus.

28. The method according to claim 27, the bolt being tightened at the end of the method and in the process being cut into the fastening apparatus or into the first or the second vehicle component up to a predefined dimension by way of a pressure force which is applied by means of the bolt head of the bolt to the composite structure comprising the vehicle components and the fastening apparatus, or the fastening apparatus or the first or the second vehicle component being deformed up to a predefined dimension, as a result of which the longitudinal extent of the composite structure comprising the vehicle components and the fastening apparatus is reduced by a predefined dimension, and therefore one or more centering elements move away from one another again by a predefined dimension at least in the longitudinal direction.

* * * * *